(12) United States Patent
West et al.

(10) Patent No.: US 11,344,155 B2
(45) Date of Patent: **\*May 31, 2022**

(54) CHARCOAL GRILL SYSTEM AND METHOD FOR MANAGING TEMPERATURE WITHIN THE SAME CHARCOAL GRILL SYSTEM

(71) Applicant: Spark Grills, Inc., Boulder, CO (US)

(72) Inventors: Benjamin West, Boulder, CO (US); Steve Owen, Fremont, CA (US)

(73) Assignee: Spark Grills, Inc., Boulder, CO (US)

( * ) Notice: Subject to any disclaimer, the term of this patent is extended or adjusted under 35 U.S.C. 154(b) by 89 days.

This patent is subject to a terminal disclaimer.

(21) Appl. No.: 16/695,059

(22) Filed: Nov. 25, 2019

(65) Prior Publication Data
US 2020/0163489 A1 May 28, 2020

Related U.S. Application Data

(63) Continuation of application No. 15/867,378, filed on Jan. 10, 2018, now Pat. No. 10,517,429.
(Continued)

(51) Int. Cl.
*A47J 37/07* (2006.01)
*A47J 36/32* (2006.01)

(52) U.S. Cl.
CPC ......... *A47J 37/079* (2013.01); *A47J 37/0704* (2013.01); *A47J 37/0754* (2013.01); *A47J 37/0786* (2013.01); *A47J 36/321* (2018.08)

(58) Field of Classification Search
CPC .. A47J 37/079; A47J 37/0786; A47J 37/0704; A47J 37/0754; A47J 36/321;
(Continued)

(56) References Cited

U.S. PATENT DOCUMENTS

| 4,953,533 A | 9/1990 | Witt |
| 8,596,258 B1 | 12/2013 | Gonzalez et al. |

(Continued)

FOREIGN PATENT DOCUMENTS

| WO | 2019/140098 | 7/2019 |
| WO | WO2021155060 | 8/2021 |

OTHER PUBLICATIONS

Notice of Allowance, dated Sep. 18, 2019, for U.S. Appl. No. 15/86,378.
(Continued)

*Primary Examiner* — Alfred Basichas
(74) *Attorney, Agent, or Firm* — Weaver Austin Villeneuve & Sampson LLP

(57) ABSTRACT

A method for managing temperature within a charcoal grill system includes: receiving a target grill temperature for a cooking chamber within the charcoal grill system; in response to receiving an ignition trigger, entering an ignition mode; during the ignition mode, activating an igniter within the charcoal grill system to ignite a charcoal cartridge arranged in a cartridge chamber within the charcoal grill system and activating a stoke fan coupled to the cartridge chamber to accelerate combustion of the charcoal cartridge; monitoring a temperature inside the charcoal grill system; in response to the temperature inside the charcoal grill system exceeding an ignition temperature, entering a temperature management mode; and during the temperature management mode, selectively activating the stoke fan and the cooling fan to maintain the cooking chamber at approximately the target grill temperature.

23 Claims, 6 Drawing Sheets

Related U.S. Application Data

(60) Provisional application No. 62/444,575, filed on Jan. 10, 2017.

(58) Field of Classification Search
CPC .... A47J 27/0002; A47J 36/2477; A47J 36/30; A47J 36/32
See application file for complete search history.

(56) References Cited

U.S. PATENT DOCUMENTS

| | | |
|---|---|---|
| 10,517,429 B2 | 12/2019 | West et al. |
| 2003/0015188 A1 | 1/2003 | Harbin |
| 2008/0190410 A1 | 8/2008 | Krippelz et al. |
| 2009/0266351 A1 | 10/2009 | Lee |
| 2011/0132347 A1 | 6/2011 | Kim |
| 2013/0265159 A1 | 10/2013 | Durian |
| 2015/0282660 A1 | 10/2015 | Sarvestani |
| 2018/0103798 A1 | 4/2018 | Rosenbaum |
| 2018/0325314 A1 | 11/2018 | Walters |
| 2019/0099041 A1 | 4/2019 | Figueroa et al. |
| 2019/0117017 A1 | 4/2019 | West et al. |
| 2020/0163489 A1 | 5/2020 | West et al. |
| 2020/0221901 A1 | 7/2020 | West et al. |
| 2021/0235928 A1 | 8/2021 | West et al. |

OTHER PUBLICATIONS

International Search Report of the International Searching Authority, for International Patent Application No. PCT/US2019/013066, dated Mar. 22, 2019.

Written Opinion of the International Searching Authority, for International Patent Application No. PCT/US2019/013066, dated Mar. 22, 2019.

International Search Report and the Written Opinion of the International Searching Authority, dated May 11, 2021, for International Patent Application No. PCT/US2021/015575.

U.S. Appl. No. 16/832,392, filed Mar. 27, 2020, West et al.

U.S. Appl. No. 62/968,957, filed Jan. 31, 2020, West, Benjamin.

U.S. Appl. No. 17/161,619, filed Jan. 28, 2021, West, Benjamin.

Non-Final Office Action dated Nov. 24, 2021, in U.S. Appl. No. 16/832,392.

CHARCOAL GRILL SYSTEM AND METHOD FOR MANAGING TEMPERATURE WITHIN THE SAME CHARCOAL GRILL SYSTEM

CROSS-REFERENCE TO RELATED APPLICATIONS

This application is a continuation of U.S. patent application Ser. No. 15/867,378, filed Jan. 10, 2018, which claims the benefit of U.S. Provisional Application No. 62/444,575, filed on Jan. 10, 2017, which are incorporated in their entirety by this reference.

TECHNICAL FIELD

This invention relates generally to the field of charcoal grills and more specifically to a new and useful charcoal grill system and method for managing temperature within a charcoal grill system in the field of charcoal grills.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Charcoal Grill System

Figure 1A:
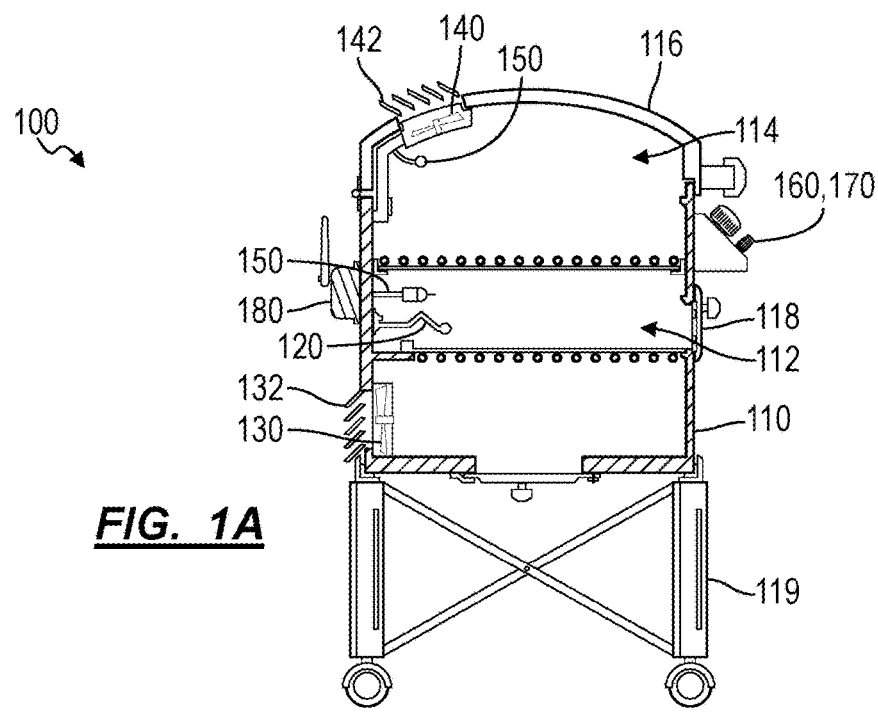
FIGS. 1A and 1B are schematic representations of a charcoal grill system.
Figure 1B:
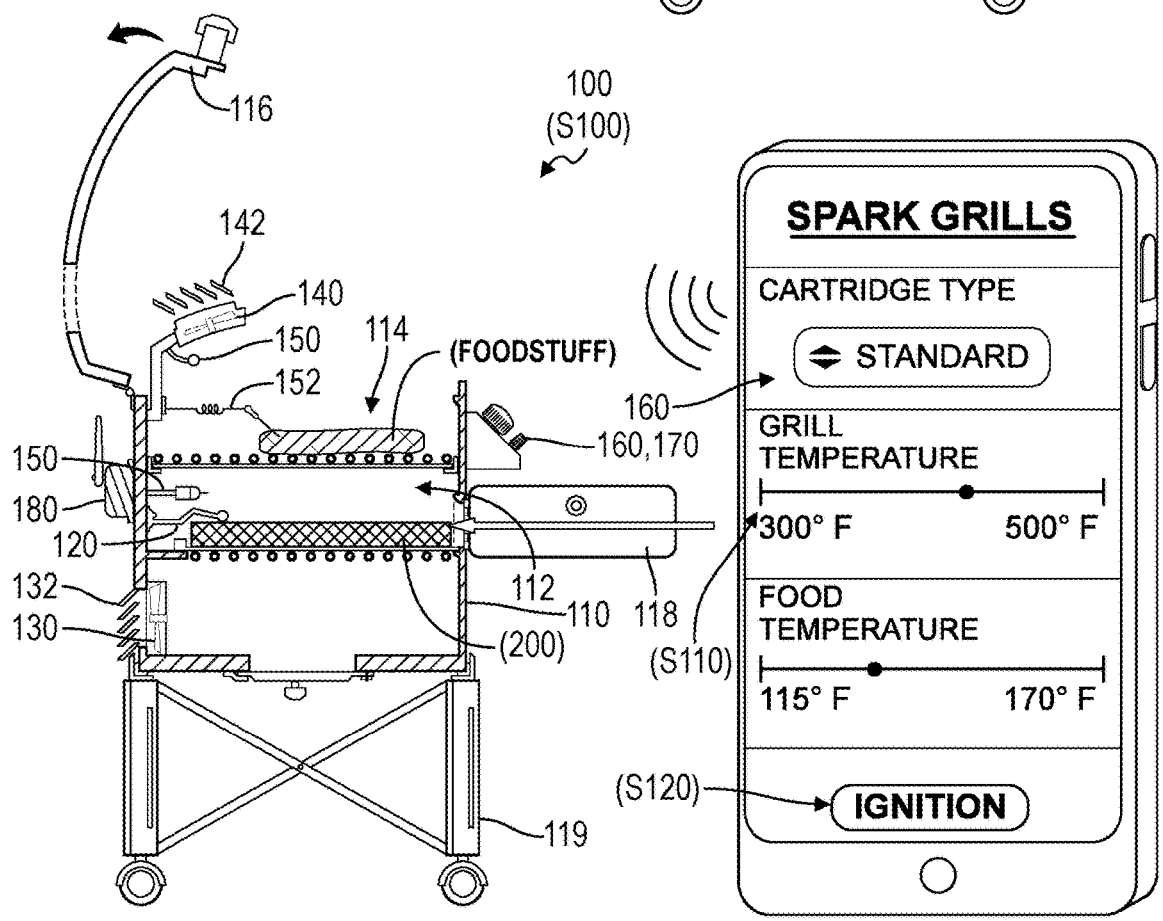

As shown in FIGS. 1A and 1B, a charcoal grill system 100 includes: a grill housing that includes a cartridge chamber configured to receive a charcoal cartridge including a mass of charcoal and starter material and a cooking chamber thermally coupled to the charcoal cartridge and configured to support foodstuffs; an igniter extending into the cartridge chamber configured to contact the charcoal cartridge in the cartridge chamber; a stoke fan configured to pump ambient air into the cartridge chamber; and a cooling fan configured to pump ambient air into the cooking chamber to cool the cooking chamber; and a temperature sensor thermally coupled to the cooking chamber. The charcoal grill system 100 also includes a controller configured to: receive a target grill temperature for the cooking chamber within the charcoal grill system 100; enter an ignition mode in response to receiving an ignition trigger; activate the igniter to ignite the charcoal cartridge within the cartridge chamber and activate the stoke fan to accelerate combustion of the charcoal cartridge during the ignition mode; and selectively activate the stoke fan and the cooling fan to maintain the cooking chamber at approximately the target grill temperature based on outputs of the temperature sensor during a temperature management mode succeeding the ignition mode.

2. Method

Figure 5A:
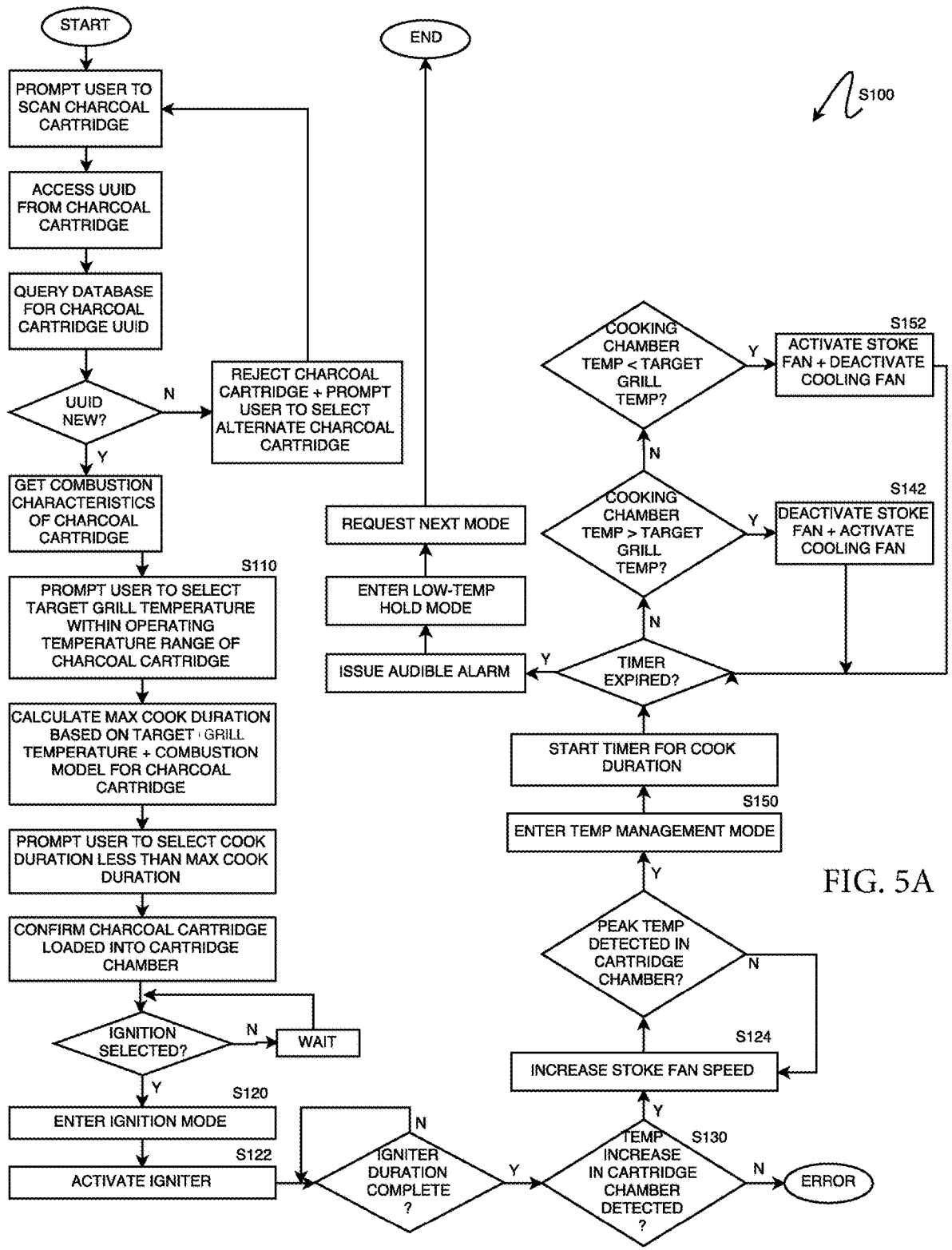
FIGS. 5A and 5B are flowchart representations of a method.
Figure 5B:
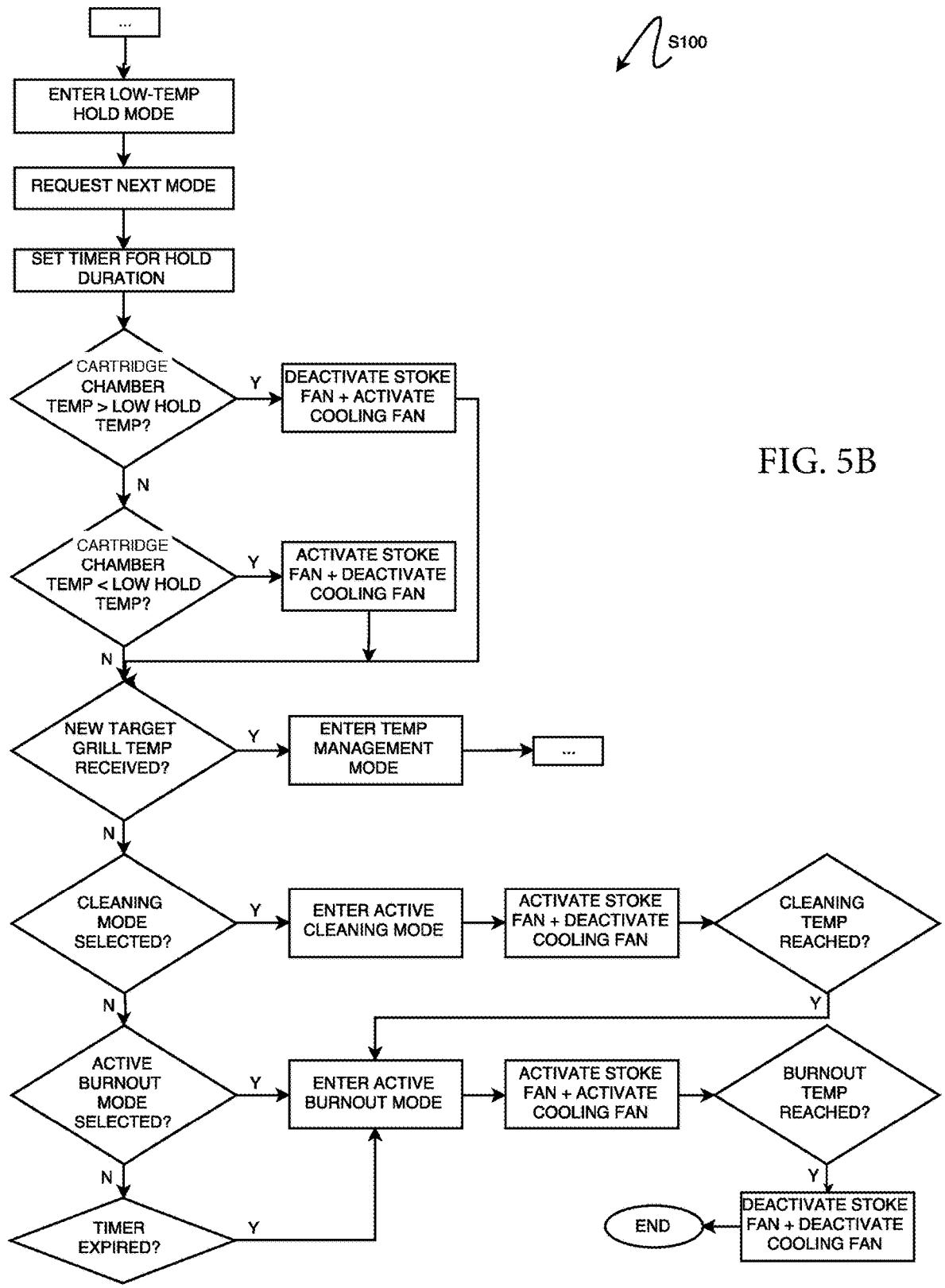
Figure 6:
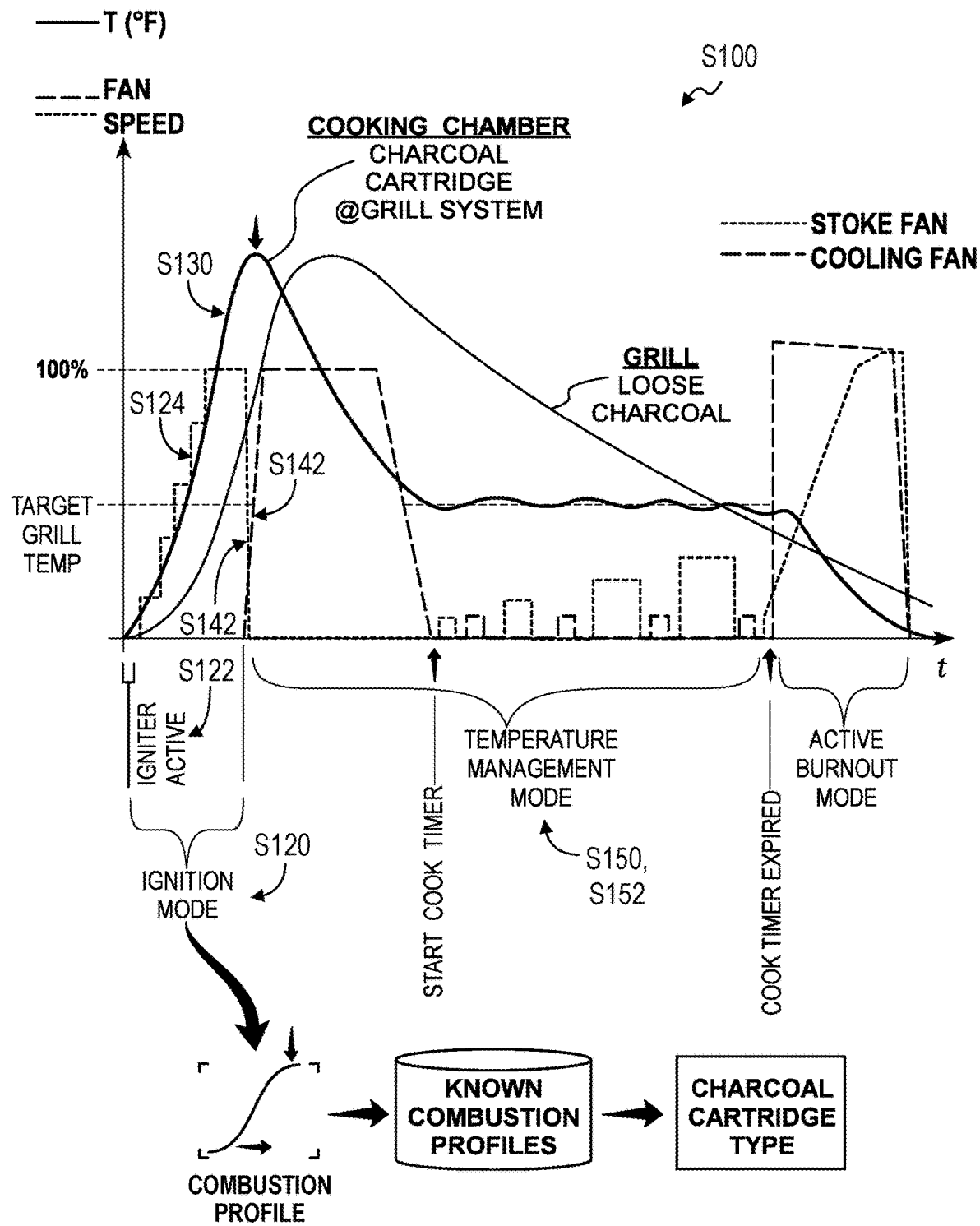
FIG. 6 is a graphical representation of one variation of the method.

As shown in FIGS. 5 and 6, a method S100 for managing temperature within a charcoal grill system 100 includes: receiving a target grill temperature for a cooking chamber within the charcoal grill system 100 in Block S110; in response to receiving an ignition trigger from a user, entering an ignition mode in Block S120; during the ignition mode, activating an igniter within the charcoal grill system 100 to ignite a charcoal cartridge arranged in a cartridge chamber within the charcoal grill system 100 in Block S122 and activating a stoke fan coupled to the cartridge chamber to accelerate combustion of the charcoal cartridge in Block S124; monitoring a temperature inside the charcoal grill system 100 in Block S130; in response to the temperature inside the charcoal grill system 100 exceeding an ignition temperature, deactivating the stoke fan in Block S140, activating a cooling fan coupled to the cooking chamber to cool the cooking chamber down to the target grill temperature in Block S142, and entering a temperature management mode in Block S150; and, during the temperature management mode, selectively activating the stoke fan and the cooling fan to maintain the cooking chamber at approximately the target grill temperature in Block S152.

3. Applications

Figure 3:
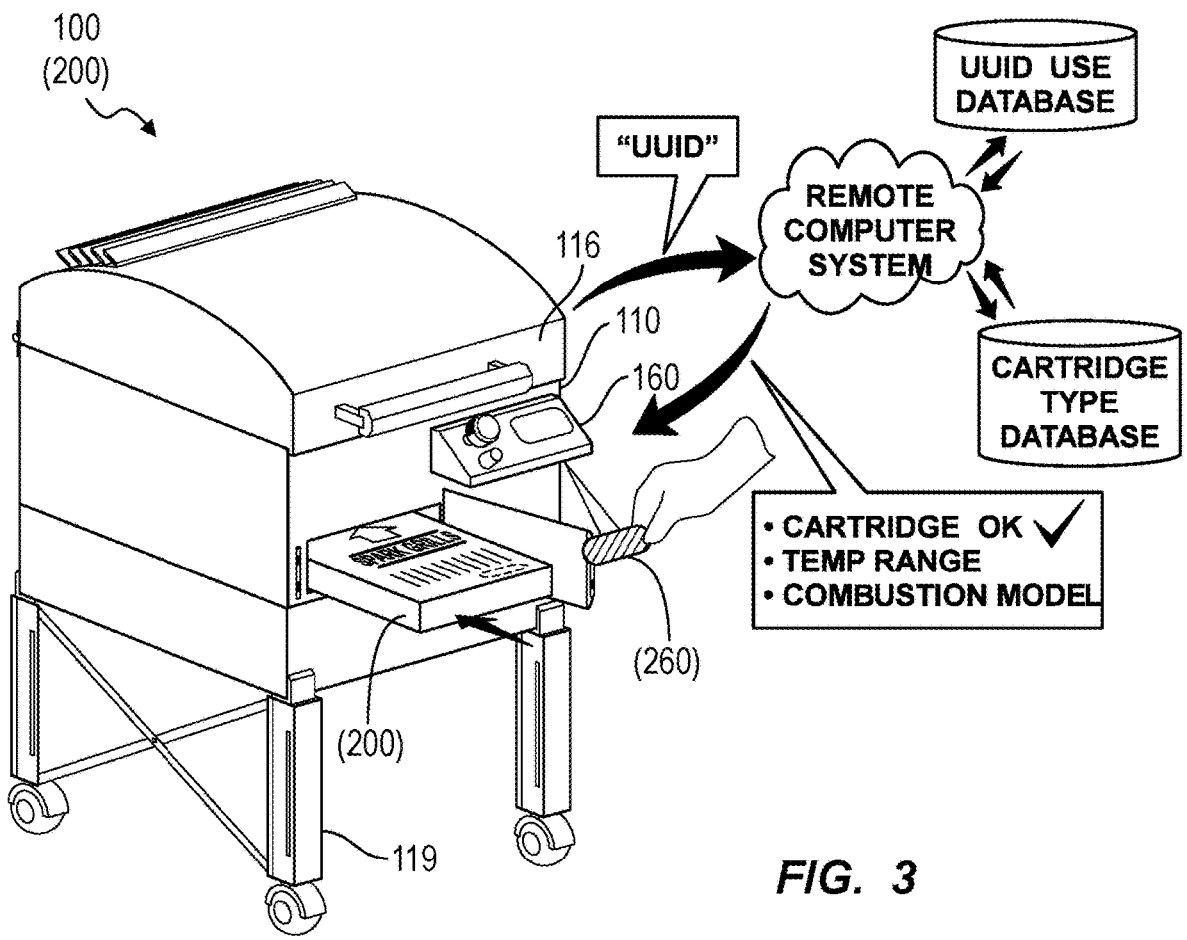
FIG. 3 is a flowchart representation of one variation of the charcoal grill system and charcoal cartridge.

Generally, Blocks of the method S100 can be executed by a charcoal grill system 100 to yield convenience of a gas grill—such as auto-ignition, rapid rise to cooking temperature, a contained fuel source, and simple temperature control—in a charcoal grill, as shown in FIGS. 1A, 1B, and 3. In particular, the method S100 can be executed by a charcoal grill system 100: to receive a target cooking temperature, cooking time, etc. at a control panel; to automatically ignite a charcoal cartridge containing a charcoal briquette upon receipt of an ignition command at the control panel; to detect and track combustion of the charcoal cartridge; to actively stoke the charcoal cartridge in order to bring the charcoal cartridge up to temperature quickly; to actively drive the temperature in a cooking chamber inside the charcoal grill system 100 to a target cooking temperature selected by a user once the charcoal cartridge has come up to temperature; and to implement closed-loop controls to selectively stoke the charcoal cartridge and cool the cooking chamber in order to maintain the temperature inside the cooking chamber at the target cooking temperature, as shown in FIGS. 5A and 6. According to the method S100, the charcoal grill system 100 can also selectively stoke the charcoal cartridge and/or cool the cooking chamber in order to: cool the cooking chamber once a user-selected cook duration expires to reduce opportunity for overcooking; cool the cooking chamber once a user-selected meat temperature is reached to reduce opportunity for overcooking; or stoke the charcoal cartridge in order to burn out the charcoal cartridge faster and to reduce waste remaining in the charcoal grill system 100 once cooking is complete; etc.

As described below, the charcoal grill system 100 can include: a grill housing that defines a cooking chamber and a cartridge chamber configured to receive charcoal cartridges; a set of temperature sensors arranged throughout the cooking chamber and the cartridge chamber; an igniter configured to locally heat a charcoal cartridge in the cartridge chamber and to cause packaging and/or an ignition layer in this charcoal cartridge to ignite; a stoke fan configured to displace air into the cartridge chamber in order to stoke a charcoal cartridge and thus increase heat output of the charcoal cartridge; a cooling fan configured to displace cooler ambient air into the cooking chamber and thus displace hot air out of the cooking chamber, thereby reducing the temperature of the cooking chamber; and a physical control panel coupled to the grill housing and/or a virtual control panel instantiated in a native application or web browser executable on a computing device and configured to receive temperature settings, time settings, and/or ignition commands. The charcoal grill system 100 can also include a controller configured to selectively activate the igniter, the stoke fan, and the cooling fan based on temperature settings, time settings, and/or ignition commands received from a user through the control panel and based on temperatures detected inside the grill housing according to Blocks of the method S100.

Historically, to prepare a charcoal grill for cooking, charcoal briquettes are brought to temperature either: by igniting these charcoal briquettes in a charcoal chimney and then dropping these charcoal briquettes into the base of a grill once hot, which may require a minimum of fifteen minutes; or by lumping charcoal briquettes in the base of the grill and igniting these charcoal briquettes with the assistance of lighter fluid, which may require as much at forty-five minutes to come to temperature. Furthermore, once ignited, these charcoal briquettes have historically been monitored manually to determine whether the charcoal briquettes are sufficiently hot and ready for use. Such charcoals grills may also require continued manual maintenance to confirm that the charcoal briquettes are still hot and to prevent overcooking of foodstuffs; and such charcoal grills may also require extensive wait times for these charcoal briquettes to cool down and may require substantive manual cleaning before stowage.

However, the charcoal grill system 100 can execute Blocks of the method S100 to automatically activate the igniter—once triggered by a user (e.g., via a single physical or virtual "ignite" button at the control panel)—to ignite a charcoal cartridge in the cartridge chamber and to inject air into the cartridge chamber (e.g., at a rate matched to the temperature of the charcoal briquettes) in order to stoke the charcoal cartridge as the charcoal cartridge begins to burn, thereby approaching a highest rate of combustion for the charcoal cartridge and thus rapidly bringing the charcoal cartridge to temperature, such as in as little as two or three minutes from first ignition, as shown in FIG. 6. During this ignition mode, the charcoal grill system 100 can also: track the temperature inside the cartridge chamber (and/or inside the cooking chamber); determine whether the charcoal cartridge has come to temperature based on the temperature inside the cartridge chamber (and/or inside the cooking chamber); and then automatically transition into a temperature maintenance mode upon determining that the charcoal cartridge has come to temperature. For example, the charcoal grill system 100 can determine that the charcoal cartridge has come to temperature: when the temperature inside the cartridge chamber reaches a generic ignition temperature; when the temperature inside the cartridge chamber reaches an ignition temperature specific to a type of the charcoal cartridge; or when the rate of increase in temperature in the cartridge chamber drops below a threshold rate (e.g., less than +10.degree. F. or less than +0.degree. F. per minute); etc. Therefore, the charcoal grill system 100 can execute Blocks of the method S100 to automatically ignite the charcoal cartridge, actively stoke the charcoal cartridge to reduce a preparation time of the charcoal cartridge, automatically detect that the charcoal cartridge has come to temperature, and then automatically transition to driving the cooking chamber to a target grill temperature upon determining that the charcoal cartridge has come to temperature—all without moving the charcoal cartridge or requiring manual input or monitoring by a user other than triggering the charcoal grill system 100 to initially ignite the charcoal cartridge.

Once the charcoal grill system 100 automatically transitions from the ignition mode into the temperature maintenance mode, the charcoal grill system 100 can: track the temperature inside the cooking chamber; selectively deactivate the stoke fan to reduce thermal output of the charcoal cartridge and activate the cooling fan to inject cool air into the cooking chamber when the temperature of the cooking chamber exceeds a target grill temperature selected by the user; and selectively activate the stoke fan to increase thermal output of the charcoal cartridge and deactivate the cooling fan when the temperature of the cooking chamber drops below the target grill temperature. Therefore, the charcoal grill system 100 can automatically monitor the temperature inside the cooking chamber and control various actuators within the charcoal grill system 100 to achieve a user-defined target grill temperature within the cooking chamber.

Furthermore, once foodstuffs in the cooking chamber reach a target food temperature or once a cook duration selected by a user expires, the charcoal grill system 100 can selectively coordinate the stoke fan and the cooling fan: to drop the temperature in the cooking chamber in order to reduce opportunity for foodstuffs in the cooking chamber to overcook; to decrease heat output of the charcoal cartridge in order to extend use of the charcoal cartridge, such as to cook a next foodstuff; or execute a burnout cycle to rapidly consume any remainder of the charcoal cartridge; or execute a cleaning cycle to escalate the temperature inside the grill housing in order to burn off debris inside the charcoal grill system 100; etc., as shown in FIG. 5B. Therefore, the charcoal grill system 100 can also automatically execute various post-cook actions in order to protect food remaining in the charcoal grill system 100, reduce fuel consumption at the charcoal grill system 100, and/or prepare the charcoal grill system 100 for stowage.

Furthermore, the method is described below as executed by a standard outdoor charcoal grill system. However, the method can also be implemented by an indoor or output fireplace, fire pit, chiminea, or charcoal chimney, etc.

4. Charcoal Cartridge

Figure 2:
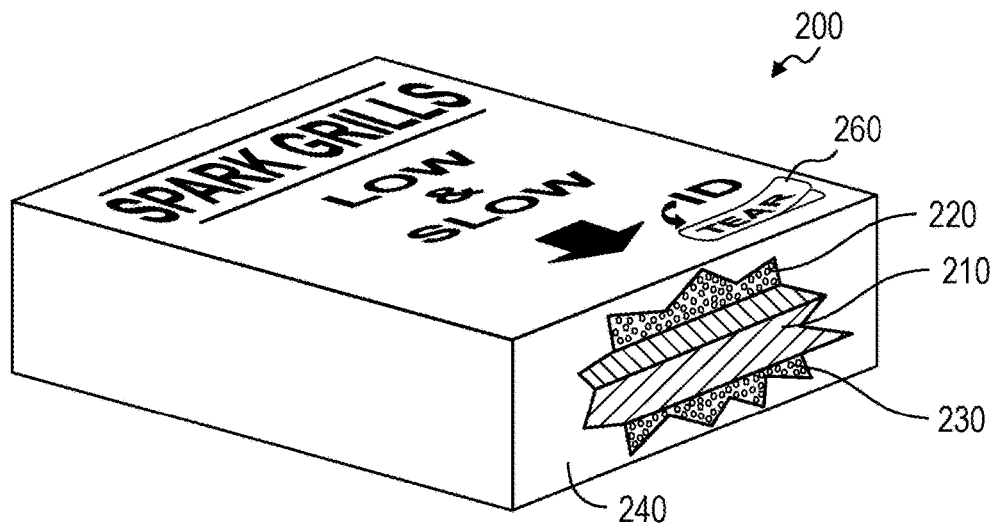
FIG. 2 is a schematic representations of a charcoal cartridge.

The charcoal grill system 100 is configured to receive, ignite, and manage a self-contained charcoal cartridge 200, as shown in FIG. 2. In one implementation, a charcoal cartridge 200 includes a unitary charcoal briquette slab, a combustible igniter layer 220 extending across the unitary charcoal briquette slab, and a flavor layer 230 encased in a combustible packaging 240. The charcoal cartridge 200 can thus be fully self-contained, including: a long-term fuel source in the form of the charcoal slab; an early ignition source—configured to heat and ignite the charcoal slab—in the form of the igniter layer 220; flavoring, such as in the form of a layer of compressed wood chips; and packaging 240 configured to encase and isolate these fuel, igniter, and flavor components from human handling, which may simplify use of the charcoal grill system 100 and charcoal cartridge 200. The charcoal cartridge 200 can also be fully combustible such that very little or none of the charcoal cartridge 200 remains in the cartridge chamber in the charcoal grill system 100 upon completion of a clean or burnout mode at the charcoal grill system 100, as described below.

4.1 Charcoal Layer

In this foregoing implementation, the charcoal layer 210 of the charcoal cartridge 200 can include a unitary charcoal briquette slab, such as in the form of a single pressed, cast, or extruded charcoal structure. The charcoal briquette slab can also be perforated to permit airflow through the charcoal cartridge 200. Alternatively, the charcoal cartridge 200 can include a group of discrete charcoal briquettes arranged in a rigid combustible support structure, such as a corrugated paper tray or corrugated paper lattice. The charcoal layer 210 in a charcoal cartridge 200 can also include additives or otherwise be of a type of charcoal that outputs heat within a particular range during typical operation of the stoke fan in the charcoal grill system 100. For example, the charcoal grill system 100 can be configured to interface with charcoal cartridges of different types and configured to output heat at different rates to support different cooking chamber temperatures (hereinafter "operating temperatures") in the charcoal grill system 100, such as: a "low-and-slow" charcoal cartridge 200 configured to support cooking chamber temperatures between 175.degree. F. and 250.degree. F.; a "standard" charcoal cartridge 200 configured to support cooking chamber temperatures between 250.degree. F. and 450.degree. F.; and a "charcoal-fired pizza" cartridge configured to support cooking chamber temperatures between 750.degree. F. and 950.degree. F.; etc.

However, a charcoal cartridge 200 can include a charcoal layer 210 of any other form or type.

4.2 Igniter Layer

The charcoal cartridge 200 can also include a combustible igniter layer 220 that extends across the charcoal layer 210 (e.g., across the unitary charcoal briquette slab). The igniter layer 220 can be of a material that is more highly combustible than the charcoal layer 210 and can be configured to ignite prior to the charcoal layer 210 when the igniter in the charcoal grill system 100 is activated. For example, the igniter layer 220 can include a layer of pressed paper soaked or impregnated with mineral oil or lighter fluid and arranged across the breadth and width of the charcoal layer 210. In another example, the igniter layer 220 can include a layer of fire starter material or lower-density charcoal granules arranged across the charcoal layer 210.

However, a charcoal cartridge 200 can include an igniter layer 220 of any other form, material, or type.

4.3 Flavor Layer

In one variation, the charcoal cartridge 200 also includes a flavor layer 230. For example, the charcoal cartridge 200 can include a layer of compressed wood chips, such as pressed hickory or applewood wood chips. In this example, the flavor layer 230 can be arranged across the charcoal layer 210 opposite the igniter layer 220.

However, a charcoal cartridge 200 can include a flavor layer 230 of any other form, material, or type.

4.4 Packaging

The charcoal cartridge 200 can also include combustible packaging 240 encompassing the unitary charcoal briquette slab and the combustible igniter layer 220. For example, the packaging 240 can include wax paper. The packaging 240 can also include text, iconography, or other visual content that indicate the type of charcoal cartridge 200, operating temperatures of the charcoal cartridge 200, and/or a flavor or wood chip type incorporated into the charcoal cartridge 200.

4.5 Igniter Lead

In one variation, the charcoal cartridge 200 also includes an igniter lead: configured to align with and to contact an igniter integrated into the charcoal grill system 100 when the cartridge is placed fully into the cartridge chamber; and including a material that exhibits greater combustibility than the packaging 240 and/or the igniter layer 220. For example, the igniter lead can include a local region of the charcoal and/or igniter layers—on one side of the cartridge—impregnated or soaked with combustible material (e.g., mineral oil) and aligned with a hole in the packaging 240 configured to contact the igniter in the charcoal grill system 100 when the charcoal cartridge 200 is inserted into the cartridge chamber. The igniter lead can thus initially ignite—with a high degree of likelihood—when the igniter is activated; this flame front can then spread to the igniter layer 220 more generally and then on to the charcoal layer 210.

4.6 Integrated Igniter

Figure 4:
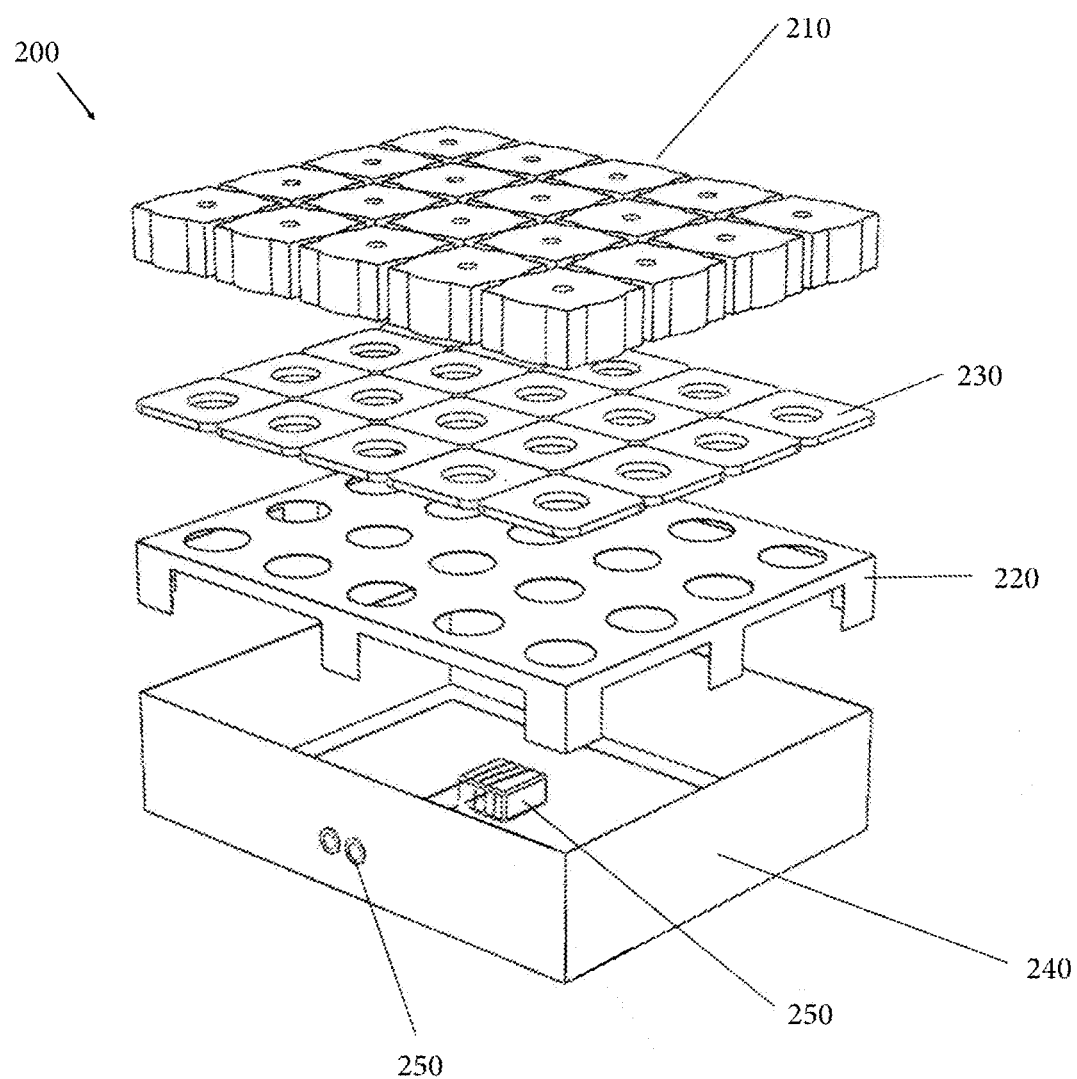
FIG. 4 is a schematic representation of one variation of the charcoal cartridge.

Alternatively, the charcoal cartridge 200 can include an integrated igniter 250, as shown in FIG. 4. For example, the integrated igniter 250 can include a heating element (e.g., a ni-chrome or tungsten resistive wire heating element) passing through the igniter layer 220, adjacent the igniter layer 220, wrapped around the charcoal cartridge 200 and igniter layer 220, or otherwise in contact with the igniter layer 220. The heating element can also include electrical contacts extending to the edge of the charcoal cartridge 200, passing through the packaging 240, and configured to mate with electrical contacts inside the charcoal grill system 100 when the charcoal cartridge 200 is inserted into the cartridge chamber. The charcoal grill system 100 can thus selectively supply electrical power to the wire heating element in the cartridge chamber—such as via a battery or other power supply in the charcoal grill system 100 when a real or virtual ignition button is selected by a user—to heat the wire heating element and thus ignite the charcoal cartridge 200.

4.7 Integrated Identifier

In one variation shown in FIG. 2, the charcoal cartridge 200 also includes an integrated identifier that indicates a unique serial number of the charcoal cartridge 200, a type of the charcoal cartridge 200, and/or combustion characteristics (e.g., operating temperatures) of the charcoal cartridge 200, etc.

In one implementation, the charcoal cartridge 200 includes a radio-frequency identification (or "RFID") tag 260 integrated into or arranged on the packaging 240 and loaded with a substantially unique identifier (or "UUID") loaded with or linked to a type of and/or combustion characteristics of the charcoal cartridge 200. In this implementation, the RFID tag 260 can be arranged on a region of the packaging 240 configured to be manually torn off of the charcoal cartridge 200 and then scanned at an RFID scanner integrated into the charcoal grill system 100 or into a user's mobile computing device to identify the charcoal cartridge 200 before igniting the charcoal cartridge 200. For example, the packaging 240 can include a metallic (e.g., aluminum foil) insert adjacent the RFID tag 260 and configured to shied the RFID tag 260 from an excitation signal when the RFID tag 260 is still intact on the package, thereby: preventing an RFID reader—such as in the charcoal grill system 100—from reading the RFID tag 260 when the RFID tag 260 is still in place on the package; ensuring that a user removes the RFID tag 260 from the package to scan the cartridge into the charcoal grill system 100, as described below; and thus ensuring that the RFID tag 260 is not burned inside the charcoal grill system 100. Therefore, in this implementation, a user may: tear the RFID tag 260 from the packaging 240; scan the RFID tag 260 at the charcoal grill system 100 or at the user's mobile computing device in order to load combustions characteristics of the charcoal cartridge 200 into the charcoal grill system 100, as shown in FIG. 4; discard the RFID tag 260; insert the charcoal cartridge 200 into the cartridge chamber; and select a real or virtual igniter button from the control panel to trigger the charcoal grill system 100 to ignite the charcoal cartridge 200.

In a similar implementation, the charcoal cartridge 200 includes a near-field communication (or "NFC") tag similarly loaded with a UUID and/or other charcoal cartridge 200-related data; and the charcoal grill system 100 can read these data from the NFC tag to identify the charcoal cartridge 200.

In another implementation, the charcoal cartridge 200 can include a barcode, quick-response code, or other visual identifying information printed on the packaging 240, such as including or linked to type and combustion characteristics of the charcoal cartridge 200. A user can thus scan these visual identifying information at an optical sensor integrated into the charcoal grill system 100 or with a mobile computing device before inserting the charcoal cartridge into the cartridge chamber; the control panel at the charcoal grill system 100 or executing on the mobile computing device can then extract or retrieve the type and combustion characteristics of the charcoal cartridge 200 from this scan.

In yet another implementation, in the variation described above in which the cartridge includes an integrated wire-heating-element-type igniter, a resistance of the heating element can be matched to a type of the charcoal cartridge 200. Once the charcoal cartridge 200 is inserted into the cartridge chamber and prior to supplying power to the igniter to ignite the charcoal cartridge 200, the charcoal grill system 100 can: read a resistance across the integrated igniter 250; and reference this resistance to a lookup table or other database to determine a type and/or combustion characteristics of the charcoal cartridge 200. For example, the charcoal grill system 100 can be configured to interface with charcoal cartridges of multiple types, and each type of charcoal cartridge 200 can be associated with a discrete range of heating element resistances, such as: a first resistance (or first discrete resistance range) for "low-and-slow" charcoal cartridges; a second resistance (or second discrete resistance range) for "low-and-slow" charcoal cartridges with hickory flavor; a third resistance (or third discrete resistance range) for "standard" charcoal cartridges; a fourth resistance (or fourth discrete resistance range) for "standard" charcoal cartridges with mesquite flavor; a fifth resistance (or fifth discrete resistance range) for high-temperature charcoal cartridges; and a sixth resistance (or sixth discrete resistance range) for high-temperature charcoal cartridges with coal additive. Thus, when a charcoal cartridge 200 is loaded into the cartridge chamber and the integrated igniter 250 in the charcoal cartridge 200 engages electrical contacts inside the charcoal grill system 100, the charcoal grill system 100 can: read the resistance across the electrical contacts; reference this resistance to a lookup table, such as stored in local memory to identify a type of the cartridge; and retrieve combustion characteristics of the cartridge accordingly before supplying power through the electrical contacts to heat the igniter and ignite the cartridge.

In another implementation, the combustible packaging 240 includes a dimpled surface or other mechanical identifier indicating a type of the charcoal cartridge 200; and the charcoal grill system 100 includes a set of feelers, switches, or other electromechanical sensors configured to engage this dimpled surface when the charcoal cartridge is inserted into the cartridge chamber. The charcoal grill system 100 can then identify a type of the charcoal cartridge 200 based on which feelers, switches, or other electromechanical sensors are depressed or otherwise change state when the charcoal cartridge 200 is inserted in to the cartridge chamber 112.

However, the charcoal cartridge 200 can include an integrated identifier of any other type, and the charcoal grill system 100 can be configured to access combustion characteristics of the charcoal cartridge 200 from this integrated identifier in any other way.

5. Grill System

As described above, the charcoal grill system 100 includes: a grill housing 110; an igniter 120; stoke and cooling fans; temperature sensors; and a controller 170.

5.1 Grill Housing

The grill housing 110 includes: a cartridge chamber 112 configured to receive a charcoal cartridge; and a cooking chamber 114 thermally coupled to the charcoal cartridge and configured to support foodstuffs. The grill housing 110 can include: a single or multi-walled metal (e.g., steel) body, such as with fiberglass or ceramic insulation; or a ceramic body The cooking chamber 114 can define a main grilling compartment in which food (e.g., meat, sausages, vegetable, etc.) is cooked within the grill housing 110 and can include one or more grate surfaces. The cooking chamber 114 is also thermally coupled to the cartridge chamber 112. For example, the cooking chamber 114 can be arranged directly over the cartridge chamber 112 such that heat emanating from the charcoal cartridge rises upwardly into the cooking chamber 114. Alternatively, the cooking chamber 114 can be arranged adjacent the cartridge chamber 112; and the charcoal grill system 100 can include a convection fan mounted inside the grill housing 110 and configured to circulate hot air from the cartridge chamber 112 into the cooking chamber 114.

As shown in FIGS. 1A and 1B, the charcoal grill system 100 can also include a lid 116 configured to enclose the cooking chamber 114. For example, the lid 116: can be arranged over or in front of the cooking chamber 114; can be hinged against or removable from the grill housing 110; can be operable in an open position to provide access to the cooking chamber 14; and can be operable in a closed position to enclose the cooking chamber 114 and to retain heat within the cooking chamber 114.

The cartridge chamber 112: is configured to receive a charcoal cartridge; is configured to support the charcoal cartridge while the charcoal cartridge combusts; and is configured to transfer heat—such as via radiation, conduction, and/or convection—into the cooking chamber 114 as the charcoal cartridge combusts. For example, the cartridge chamber 112 can include: a cartridge receptacle configured to receive a new charcoal cartridge laterally; and a door that encloses the cartridge receptacle and is configured to drive the new charcoal cartridge fully into the cartridge chamber 112—and thus into contact with the igniter 120—as the door is closed. In another example, the cartridge chamber 112 includes: a cartridge receptacle; a drawer configured to open outwardly from the cartridge receptacle, to receive a new charcoal cartridge dropped downwardly into the drawer, and to slide laterally into the cartridge receptacle to seat the new charcoal cartridge within the cartridge chamber 112 and into contact with the igniter 120.

However, the grill housing 110, cooking chamber 114, lid 116, and cartridge chamber 112 can include any other features, be of any other materials, and define any other form of geometry.

5.2 Igniter

The charcoal grill system 100 can also include an igniter 120 that extends into the cartridge chamber 112, is configured to contact the charcoal cartridge in the cartridge chamber 112, and is configured to ignite a charcoal cartridge when activated by the controller 170.

In one implementation, the igniter 120 includes an electric resistance heater, such as a ni-chrome or tungsten wire coupled to a power supply (e.g., a battery) in the charcoal grill system 100 via a relay. For example, the igniter 120 can include ni-chrome coil arranged on a spring-loaded mount arranged on a back side of the cartridge chamber 112 opposite the door of the cartridge chamber 112, as shown in FIGS. 1A and 1B. Once a new charcoal cartridge is fully inserted into the cartridge chamber 112, a leading face of the charcoal cartridge can come into contact with the igniter 120, and the spring-loaded mount can depress the igniter 120 into the charcoal cartridge while also accommodating variations in geometry or orientation of this charcoal cartridge within the cartridge chamber 112. (Alternatively, the igniter 120 can be arranged overhead or below the cartridge chamber 112 and can be configured to contact the top or bottom face of the cartridge chamber 112.)

In one variation, the charcoal grill system 100 includes multiple igniters, such as a primary igniter 120 and a backup igniter 120, both configured to contact a new charcoal cartridge loaded into the cartridge chamber 112. In the ignition mode, the controller 170 can activate both igniters (e.g., by closing corresponding relays to supply power to the igniters) to ignite the charcoal cartridge. Alternatively, the controller 170 can: read an electrical resistance across the primary igniter 120. If this electrical resistance falls within a predefined resistance range corresponding to a functional igniter, the controller 170 can then selectively activate the primary igniter 120. However, if the electrical resistance of the primary igniter 120 falls outside of the predefined resistance range, the controller 170 can: determine that the primary igniter 120 is malfunctioning; prompt user to replace the primary igniter 120 via the control panel 160; and selectively activate the secondary igniter 120 to ignite the charcoal cartridge.

However, the charcoal grill system 100 can include any other type or number of heating elements or igniters arranged in any other way.

5.3 Stoke Fan+Stoke Vent

The charcoal grill system 100 also includes a stoke fan 130 configured to pump ambient air into the cartridge chamber 112 (or to recycle internal air from the cooking chamber 114 into the cartridge chamber 112), as shown in FIGS. 1A and 1B. In particular, the stoke fan 130 can be configured to draw fresh air into the cartridge chamber 112 in order: to spread a flame front across the charcoal cartridge (e.g., during the ignition mode) and thus decrease a duration of the ignition; and to increase a rate of combustion of the charcoal cartridge (i.e., to "stoke" the charcoal cartridge) and thus increase a rate of heat output by the charcoal cartridge and increase a temperature of the cooking chamber 114 (e.g., during the temperature maintenance mode).

For example, the grill housing no can include an aperture adjacent the cartridge chamber 112; and the stoke fan 130 can include an electric fan configured to push ambient air into the cartridge chamber 112. Alternatively, the stoke fan 130 can be mounted remotely from the cartridge chamber 112, and an output of the stoke fan 130 can be fluidly coupled to the cartridge chamber 112 via ductwork. However, the stoke fan 130 can include any other type of fan arranged in any other way in the charcoal grill system 100.

Furthermore, the charcoal grill system 100 can include a stoke vent 132 arranged across an inlet of the stoke fan 130 and including a shutter configured to actively or passively close the inlet of the stoke fan 130, thereby inhibiting back flow of heat from the cartridge chamber 112, through the stoke fan 130 (which may melt or otherwise damage the stoke fan 130), and out of the charcoal grill system 100 (which may reduce thermal efficiency of the charcoal grill system 100). For example, the stoke vent 132 can include a set of louvers and a solenoid or other actuator configured to open and close the louvers. In this example, the controller 170 can: trigger the actuator to close the louvers in the stoke vent 132 when the stoke fan 130 is inactive; and trigger the actuator to open the louvers when the stoke vent 132 is active, such as proportional to a speed of the stoke fan 130. Alternatively, louvers in the stoke vent 132 can be configured to passively open in the presence of a drop in pressure between the stoke vent 132 and the stoke fan 130 when the stoke fan 130 is active. However, the stoke vent 132 can include any other type of vent controller 170 in any other way.

5.4 Cooling Fan+Cooling Vent

The charcoal grill system 100 also includes a cooling fan 140 configured to pump ambient air into the cooking chamber 114 to cool the cooking chamber 114. Similar to the stoke fan 130, the cooling fan 140 is configured to draw cool air into the cook chamber in order to displace heated air out of the cooking chamber 114, thereby reducing a temperature inside the cooking chamber 114. The charcoal grill system 100 can also include a cooling vent 142 fluidly coupled to the cooling fan 140 and passively or actively controlled by the controller 170, similar to the stoke vent 132 described above.

In one implementation, the lid 116 defines an aperture over the cooking chamber 114; the cooling fan 140 is mounted across (or fluidly coupled to) the aperture; the cooling vent 142 is arranged across the inlet side of the cooling fan 140; and electrical lines for the cooling fan 140 and/or cooling vent 142 pass through a hinge between the lid 116 and the grill housing 110. In another implementation shown in FIGS. 1A and 1B: the lid 116 defines an aperture over the cooking chamber 114; the grill housing 110 includes a support arm arranged inside the cooking chamber 114 and extending upwardly toward the aperture in the lid 116 when the lid 116 is closed; the cooling vent 142 is mounted to the support arm and is configured to fill the aperture when the lid 116 is closed; the cooling fan 140 is mounted to the support arm, such as set inside or outside of the inlet vent; and electrical lines extending from the controller 170, into the grill housing 110, through the support arm, and to the cooling fan 140 (and to the cooling vent 142), thereby avoiding electrical lines passing through a hinge between the grill housing no and the lid 116.

5.5 Convection Fan

In one variation, the charcoal grill system 100 also includes a convection fan: mounted inside the cooking chamber 114, such as supported on the grill housing 110; and configured to circulate heated air inside the cooking chamber 114. For example, the controller 170 can actively activate the convection fan when "low-and-slow" charcoal cartridges are loaded into the charcoal grill system 100 in order to maintain a consistent, substantially uniform temperature inside the cooking chamber 114.

5.6 Dividers

In one variation, the charcoal grill system 100 also includes internal dividers arranged (permanently or removably) inside the cooking chamber 114 and configured to produce multiple temperature zones within the cooking chamber 114, such as a 'hot zone' directly over the cartridge chamber 112 and an adjacent 'warm' zone.'

5.7 Temperature Sensors

The charcoal grill system 100 also includes a suite of temperature sensors, such as thermocouples, resistance temperature detectors (or "RTDs"), or negative temperature coefficient (or "NTC") thermistors, etc., as shown in FIGS. 1A and 1B.

In one implementation, the charcoal grill system 100 includes a set of (i.e., one or more) temperature sensors proximal the cartridge chamber 112 and configured to output signals corresponding to temperatures in the cartridge chamber 112. For example, the charcoal grill system 100 can include: one temperature sensor 150 arranged in the cartridge chamber 112 over the igniter 120; and another temperature sensor 150 arranged to the back of and above the cartridge receptacle in the cartridge chamber 112.

The charcoal grill system 100 can also include a set of temperature sensors proximal the cooking chamber 114 and configured to output signals corresponding to temperatures in the cooking chamber 114. For example, the charcoal grill system 100 can include: a temperature sensor 150 mounted to the lid 116 overhead the cooking chamber 114; a temperature sensor 150 mounted adjacent the cooling fan 140; a temperature sensor 150 facing a 'hot zone' in the cooking chamber 114; and/or a temperature sensor 150 facing a 'warm zone' in the cooking chamber 114.

The charcoal grill system 100 can also include or can be configured to interface with a temperature probe 152 (or "meat thermometer," "cooking thermometer," or "food thermometer"), as shown in FIGS. 1A and 1B. For example: the control panel 160 and the controller 170 can be mounted to the charcoal grill system 100 outside of the grill housing 110; a probe jack can be mounted inside the cooking chamber 114 and electrically coupled to the controller 170; a first end of the thermometer probe can be inserted into a foodstuff cooking within the cooking chamber 114; and a second end of the thermometer probe can be inserted into the probe jack. In this example, the controller 170 can: receive a target food temperature selected by a user via the control panel 160; monitor a temperature of the foodstuff in the cooking chamber 114 via the temperature probe 152 inserted into the foodstuff; and then transition out of the temperature management mode and into a low-temperature hold mode (e.g., by deactivating the stoke fan 130 and activating the cooling fan 140 to cool the cooking chamber 114) once the temperature of the foodstuff—read from the temperature probe 152—reaches the target food temperature. Therefore, in the charcoal grill system 100 that includes or interfaces with a food thermometer, the controller 170 can selectively transition between modes based on a temperature read from the food thermometer.

5.8 Other Sensors

In one variation, the charcoal grill system 100 also includes position or lock sensors configured to output signals corresponding to states of the lid 116 and/or the cartridge chamber door 118 (or drawer) in the charcoal grill system 100. For example, the charcoal grill system 100 can include electromechanical limit switches, Hall effect sensors, or sensors of any other type physically coupled to the lid 116, electrically coupled to the controller 170, and to indicate to the controller 170 when the lid 116 and the cartridge chamber door 118, respectively, are open.

5.9 Locks

Furthermore, the charcoal grill system 100 can include locks on the lid 116 and/or on the cartridge chamber door 118 (or drawer). For example, the charcoal grill system 100 can include electromechanical or electromagnetic locks controlled by the controller 170 to selectively lock the lid 116 and the cartridge chamber door 118 in closed positions, such as during the ignition mode and during the cleaning mode. In this example, the charcoal grill system 100 can also include a tilt or position sensor and can automatically trigger the locks on the lid 116 and/or the charcoal cartridge door 118 to engage when an output of the tilt or position sensor indicates that the charcoal grill system 100 is tipping over.

5.10 Power Supply

The charcoal grill system 100 can also include an integrated power supply to power the igniter 120, the stoke fan 130, the cooling fan 140, and the controller 170, etc. For example, the charcoal grill system 100 can include: a chassis 119 configured to support the grill housing 110; and a rechargeable battery mounted to the chassis 119 outside of and thermally isolated from the grill housing 110.

5.11 Control Panel

The charcoal grill system 100 includes (or interfaces with) a control panel 160: configured to communicate temperature, cook duration, and mode options to a user; and configured to receive ignite, temperature, time, and mode selections from the user.

In one implementation shown in FIG. 3, the control panel 160 is physically instantiated at the charcoal grill system 100. For example, the control panel 160 can include: a display, a separate ignition button, and separate time and temperature adjust knobs; or a touchscreen implementing similar functionality mounted to the chassis 119 adjacent the grill housing 110. In this example, the display or touchscreen can render: the operating temperature range of a charcoal cartridge loaded into the cartridge chamber 112; a maximum (remaining) cook duration supported by the charcoal cartridge; a type of the charcoal cartridge; a current target food temperature; a current target grill temperature; a current cooking chamber 114 temperature; time remaining in a current ignition mode; time remaining in a selected cook duration; available operating modes of the charcoal grill system 100; etc. locally at the charcoal grill system 100. The control panel 160 can also receive selection or adjustment of the foregoing operating options locally at the charcoal grill system 100. The control panel 160 can also include an audible alarm and/or can render a visual alarm on the display or touchscreen when a cook duration has expired, when a temperature inside the cooking chamber 114 has reached the target grill temperature, and/or when a foodstuff inside the cooking chamber 114 has reach a target food temperature selected by the user.

In another implementation shown in FIG. 1B, the control panel 160 is virtually instantiated at an external computing device (e.g., a smartphone, tablet, smartwatch, or other mobile computing device). For example, the control panel 160 can be virtually instantiated within a native application or configured to execute on a mobile computing device; or the control panel 160 can be virtually accessed through a web browser executing on such a device. In this implementation, the charcoal grill system 100 can further include a wireless communication module 180 configured to connect with the mobile computing device: to send temperature and cartridge-related data, etc. to the virtual control panel 160; and to receive ignition triggers and temperature settings, etc. from the virtual control panel 160.

The control panel 160 can therefore include a real or virtual ignition button; upon selection of the ignition button, the controller 170 can transition into an ignition mode and activate the igniter 120. The control panel 160 can also receive time and temperature settings through the control panel 160 can then implement these settings during a subsequent temperature maintenance mode.

5.12 Controller

The charcoal grill system 100 further includes a controller 170 configured to execute Blocks of the method S100. In particular, the controller 170 can: receive a target grill temperature for the cooking chamber 114 through the control panel 160; enter an ignition mode in response to selection of the (real or virtual) ignition button at the control panel 160; activate the igniter 120 to ignite the charcoal cartridge within the cartridge chamber 112 and activate the stoke fan 130 to accelerate combustion of the charcoal cartridge during the ignition mode; and selectively activate the stoke fan 130 and the cooling fan 140 to maintain the cooking chamber 114 at approximately the target grill temperature based on outputs of the temperature sensor 150 during a temperature management mode succeeding the ignition mode.

Generally, the controller 170 can be arranged on the charcoal grill system 100, such as mounted to the chassis 119 outside of the grill housing 110. For example, the controller 170: can be arranged alongside or integrated into the control panel 160; can be electrically coupled to the control panel 160 and/or to a wireless communication module 180 to receive temperature, time, and other settings elected by a user; can be electrically coupled to the power supply and to a set of relays; and can selectively activate the stoke fan 130, the cooling fan 140, and the igniter 120, etc. by selectively closing these relays during ignition, temperature management, low-temperature hold, burnout, cleaning, and/or other modes.

6. Pre-Ignition Cartridge Detection

In one variation shown in FIGS. 3 and 5A, the controller can: identify a type of a charcoal cartridge loaded into or soon to be loaded into the cartridge chamber; access combustion characteristics known for this type of charcoal cartridge; and then prompt or otherwise enable the user to adjust control functions of the charcoal grill system 100 based on these combustion characteristics. For example, in this variation, the controller can: identify a type of the charcoal cartridge; access an operating temperature range of the charcoal cartridge based on the type of the charcoal cartridge; and prompt the user to select a target grill temperature within the operating temperature range of the charcoal cartridge.

6.1 Automated Charcoal Cartridge Identification

In one implementation, the charcoal grill system 100 includes a wireless scanner coupled to the control panel and configured to read a UUID from an identification tag associated with a charcoal cartridge before the charcoal cartridge is loaded into the cartridge chamber. Before entering the ignition mode, the controller can thus: read a UUID from an identification tag associated with the charcoal cartridge via the wireless scanner; query a lookup table stored in local (or remote) memory for the operating temperature range of the charcoal cartridge—defined by a minimum temperature and a maximum temperature in the cooking chamber supported by the charcoal cartridge—based on the UUID; and prompt the user—via the control panel—to select a target grill temperature within this operating temperature range.

In this implementation, the wireless scan can include a RFID reader; and a charcoal cartridge can include a removable RFID tag arranged on its packaging. Before inserting the charcoal cartridge into the cartridge chamber, a user can tear the RFID tag from the packaging and scan the RFID tag at the RFID reader. The RFID reader can thus read a UUID from the RFID tag and pass this UUID to the controller. Upon receipt of the UUID, the controller can extract various data directly from UUID, such as: an operating temperature range of the charcoal cartridge, a combustion duration of the charcoal cartridge, and/or a model linking cooking chamber temperature to combustion duration for the charcoal cartridge. For example, the controller can extract: 175.degree. F. to 250.degree. F. for eight hours from a UUID read from a "low and slow barbecue" charcoal cartridge; 300.degree. F. to 500.degree. F. for four hours from a UUID read from a "standard" charcoal cartridge; or 700.degree. F. to 900.degree. F. for one hour from a UUID read from a "charcoal-fired pizza" charcoal cartridge. Alternatively, the controller can extract a type of the charcoal cartridge from the UUID read from the RFID tag torn from the charcoal cartridge and then reference a lookup table—stored in local memory on the charcoal grill system 100 or stored in a remote database—for an operating temperature range and combustion duration of the charcoal cartridge based on the cartridge type. Yet alternatively, the controller can pass the UUID to a remote database, which can interpret the UUID and return various combustion characteristics of the charcoal cartridge to the controller.

In this implementation, the controller can also query local memory in the charcoal grill system 100 for the same UUID to confirm that this RFID tag was not previously scanned at the charcoal grill system 100. In particular, the controller can maintain a log of cartridge UUIDs read by the RFID reader over time and can authorize an ignition mode and temperature control at the charcoal grill system 100 only after a new, unique UUID is read from a charcoal cartridge, thereby ensuring that the charcoal grill system 100 operates according to the method S100 only when new cartridges are installed in the cartridge chamber.

Similarly, for the charcoal grill system 100 than includes a wireless communication module, as described above, the controller can pass the UUID back to a remote server via the wireless communication module; the remote server can then retrieve the type of the charcoal cartridge, an operating temperature range and/or useful combustion duration of the charcoal cartridge, and/or whether this UUID was read previously at this charcoal grill system 100 or at another instance of the charcoal grill system 100.

Therefore, if the controller or the remote server determines that a UUID read from a charcoal cartridge at the charcoal grill system 100 was read previously (e.g., at the same or other charcoal grill system 100) and that the UUID therefore corresponds to a used cartridge, the controller can reject the cartridge and interface with the control panel to prompt the user to scan a new cartridge. For example, the controller can trigger an audible and/or visual alert at the charcoal grill system 100 to indicate that the RFID tag was thus rejected. Alternatively, the controller can transmit a notification to the user's mobile computing device to issue a notification specifying that the RFID tag was rejected and including a prompt to scan an RFID tag from a new charcoal cartridge. In this implementation, the controller can also maintain a lock at the cartridge chamber door in a locked state to prevent insertion of a charcoal cartridge until a new, unique UUID is read from a charcoal cartridge.

However, if the controller or the remote server confirms that the UUID corresponds to a new charcoal cartridge, the controller can: authorize use of the charcoal cartridge at the charcoal grill system 100; load the operating temperature range and the combustion duration of the charcoal cartridge; and/or unlock the cartridge chamber door; etc. accordingly. The control panel can then enable certain temperature and timer settings based on this operating temperature range and the combustion duration of the cartridge, as described below.

Furthermore, once the UUID is read from the RFID tag and once an ignition mode is subsequently executed by the charcoal grill system 100, the controller can store this UUID as corresponding to a used charcoal cartridge, such as in local memory or in a remote database accessible to the charcoal grill system 100 and to other instances of the charcoal grill system 100.

The controller can implement similar methods and techniques to identify the charcoal cartridge and to retrieve related data based on: data collected from an NFC tag arranged on the charcoal cartridge; a barcode or quick-response code read from the charcoal cartridge; or other optical features scanned from the charcoal cartridge; etc. As described above, the controller can alternatively identify the charcoal cartridge based on select feelers or other electromagnetic sensors—arrange in the charcoal chamber—that are depressed when the charcoal cartridge is inserted into the cartridge chamber.

6.2 Manual Charcoal Cartridge Identification

Alternatively, the controller can prompt the user—via the control panel—to identify a type of the charcoal cartridge. For example: the control panel can render a dropdown menu of known charcoal cartridge types (e.g., at the charcoal grill system 100 or at an external mobile computing device); a user can select a type of the charcoal cartridge from this dropdown menu; and the controller can retrieve combustion characteristics of the charcoal cartridge and enable ignition of the charcoal cartridge upon receipt of this charcoal cartridge type selection.

Alternatively, the controller can determine a type of the charcoal cartridge based on burn characteristics of the charcoal cartridge tracked during an ignition mode, as described below. However, the controller can preemptively identify a type of the charcoal cartridge in any other way prior to entering the ignition mode in Block S120.

7. Time and Temperature Setting

Block S110 of the method S100 recites receiving a target grill temperature for a cooking chamber within the charcoal grill system 100. Generally, in Block S110, the controller can access a target grill temperature for the cartridge chamber, such as based on a selection entered manually by a user or otherwise associated with a charcoal cartridge loaded into the cartridge chamber.

In one implementation shown in FIGS. 1B and 4A, once the controller identifies a type of the charcoal cartridge and/or retrieves an operating temperature range of the charcoal cartridge, such as described above, the control panel can: render the operating temperature range (e.g., a minimum and a maximum cooking chamber temperature supported by the charcoal cartridge) at the control panel; and prompt the user to select a target grill temperature between the minimum temperature and the maximum temperature, inclusive, at the control panel.

The control panel can also prompt the user to select a cook duration, such as a cook duration less than a present maximum cook duration associated with the type of the charcoal cartridge. Alternatively, the controller can: access a combustion model of the charcoal cartridge—that estimates a combustion duration of the charcoal cartridge as a function of temperature inside the cooking chamber—based on the type of the charcoal cartridge; estimate a maximum cook duration supported by the charcoal cartridge for the selected target grill temperature based on the combustion model and the target grill temperature selected by the user; and prompt the user—via the control panel—to select a target cook duration that is less than this maximum cook duration. Therefore, the controller can: access a combustion model that represents durations over which the charcoal cartridge can achieve a particular cartridge chamber temperature over the operating temperature range of the charcoal cartridge; and implement this combustion model to dynamically limit the target cook duration selectable by the user based on the target grill temperature previously selected by the user.

Alternatively, the controller can implement similar methods and techniques to: first prompt the user to select a target cook duration; dynamically recalculate a maximum grill temperature supported by the charcoal cartridge for this target cook duration based on the combustion model; and prompt the user to select a target grill temperature less than this maximum grill temperature.

The controller can additionally or alternatively receive a target food temperature via the control panel. The controller can then monitor a temperature of a foodstuff inside the charcoal grill system 100 via a temperature probe inserted into the foodstuff, as described above, and selectively transition out of the temperature management mode once the temperature probe reads (or approaches) the target food temperature.

Therefore, the controller can receive fixed time and temperature settings for the upcoming or current temperature management mode. For example, the user can set a target grill temperature of 225.degree. F. for a target duration of six hours before or after loading a "low-and-slow" charcoal cartridge into the cartridge chamber. The controller can then: automatically initiate a timer for six hours upon transitioning from the ignition mode to the temperature maintenance mode, when the lid is opened and then closed (which may indicate that food was placed in the cooking chamber), or when a cook timer is manually activated by the user; maintain the cooking chamber at the target grill temperature of 225.degree. F. while the timer is current; and then trigger an alarm and drop the cooking chamber to a minimum temperature (e.g., by deactivating the stoke fan and active the cooling fan) in order to reduce a cook rate of food remaining in the cooking chamber while waiting for the user to remove the food from the cooking chamber following expiration of the timer.

The controller can also receive a dynamic target temperature profile and/or other triggers for switching between modes from the user via control panel. For example, the control panel can enable the user to: set a target grill temperature of 225.degree. F. for a "low-and-slow" charcoal cartridge; set a target food temperature of 115.degree. for steak (or 150.degree. F. for poultry, 130.degree. for pork, etc.); and set a max cooking chamber temperature for three minutes once the target food temperature is reached. The controller can implement methods and techniques described below to maintain the cooking chamber at the target grill temperature of 225.degree. F. while tracking the temperature of food in the cooking chamber via the temperature probe. However, once the temperature probe indicates that the target food temperature has been reached, the controller can deactivate the cooling fan and activate the stoke fan at maximum speed (e.g., a "sear mode") for three minutes in order to raise the temperature in the cooking chamber and sear food in the cooking chamber. Finally, once this three-minute sear time expires, the controller can trigger an alarm and drop the cooking chamber to a minimum temperature (e.g., by deactivating the stoke fan and activating the cooling fan) in order to reduce a cook rate of food remaining in the cooking chamber while waiting for the user to remove the food from the cooking chamber.

However, the controller can cooperate with the control panel to collect any other settings from the user, such as prior to executing an ignition mode, prior to a temperature maintenance mode and during the ignition mode, or upon completing a temperature maintenance mode.

However, if the user fails to elect a target grill temperature (or if the charcoal grill system 100 identifies a type of the charcoal cartridge during or after the ignition cycle, as described below), the charcoal grill system 100 can elect a standard or default temperature for the type of the charcoal cartridge and implement this default temperature during the temperature management mode described below until the user overrides this default temperature with another target grill temperature.

8. Ignition Mode

Block S120 of the method S100 recites, in response to receiving an ignition trigger from a user, entering an ignition mode; Block S122 of the method S100 recites activating an igniter within the charcoal grill system 100 to ignite a charcoal cartridge arranged in a cartridge chamber within the charcoal grill system 100 during the ignition mode; and Block S124 of the method S100 recites activating a stoke fan coupled to the cartridge chamber to accelerate combustion of the charcoal cartridge during the ignition mode. Generally, in Blocks S120, S122, and S124, the controller enters an ignition mode once a charcoal cartridge has been loaded into the cartridge chamber and in response to manual selection of the ignition button at the control panel.

At the beginning of an ignition mode, the controller can: trigger the stoke vent to open; set the stoke fan at null or low-power setting; deactivate the cooling fan, and then activate the ignition, such as by triggering a relay to close the supply power to the igniter, as shown in FIG. 6. The controller can continue to supply power to the igniter for preset duration (e.g., thirty seconds) or until a temperature sensor arranged near the cartridge chamber indicates an increase in temperature in the cartridge chamber, such as an increase in temperature in excess of a threshold magnitude (e.g., 10 degrees) or in excess of a threshold rate (e.g., 10.degree. F. increase in ten seconds). The controller can thus correlate an increase in temperature or a positive rate of temperature increase in the cartridge chamber as an indication that the charcoal cartridge has ignited and then deactivate the igniter accordingly, as shown in FIG. 5B. Therefore, the controller can: continuously monitor a temperature proximal the cartridge chamber following activation of the igniter; and deactivate the igniter in response to detecting an increase in temperature proximal the cartridge chamber. Similarly, following activation of the igniter, the controller can calculate a rate of temperature change within the charcoal grill system 100 and then confirm ignition of the charcoal cartridge in response to this rate of temperature change exceeding a preset threshold rate. Alternatively, the controller can deactivate the igniter at the shorter of (or the longer of) either of these time or temperature change triggers.

Furthermore, the controller can continuously or intermittently increase a speed of the stoke fan throughout the ignition mode, as shown in FIG. 6. For example, the controller can monitor the temperature proximal the cartridge chamber—via the cartridge chamber temperature sensor—in Block S130 following activation of the igniter; and increase a speed of the stoke fan proportional to the cartridge chamber temperature. In this example, if the speed of the stoke fan is too high, air may pass into the cartridge chamber at a rate sufficient to extinguish flame on the charcoal cartridge; conversely, if the speed of the stoke fan speed is too low, the charcoal cartridge may combust more slowly and may thus require more time to reach operating temperature. Therefore, the controller can increase the speed of the stoke fan as a function of temperature inside the grill housing (e.g., in or adjacent the cartridge chamber), such as based on a generic stoke fan speed/cartridge chamber temperature function or based on a stoke fan speed/cartridge chamber temperature function specific to a type of the charcoal cartridge. In this implementation, for the stoke vent configured to be actively adjusted over a range of open positions, the controller can similarly adjust the position of the stoke vent as a function of cartridge chamber temperature.

Once the controller determines that the charcoal cartridge has ignited, the controller can maintain the stoke fan in an active state and can monitor the interior of the grill housing for a trigger event indicating that the charcoal cartridge has come up to temperature. In one example, the controller can execute the ignition mode for a preset duration—such as four minutes or five minutes—following entry into the ignition mode or following confirmation that the charcoal cartridge has ignited. In another example, the controller can determine that the charcoal cartridge has come up to temperature once a rate of change in temperature in the cartridge chamber drops below a threshold rate (e.g., 1.degree. F. per second). In this example, the controller can: regularly calculate a rate of temperature change within the charcoal grill system 100 during the ignition cycle; determine that the charcoal cartridge has approximately reached a peak temperature (i.e., "come up to temperature") if this rate of change was previously more positive but has now fallen below a preset threshold rate of change (and if the current cooking chamber temperature exceeds the target grill temperature, or "ignition temperature"); and then transition into the temperature management mode in response to determining that the charcoal cartridge has approximately reached its peak temperature.

In yet another example, the controller can: retrieve a peak estimated temperature (e.g., an "ignition temperature") that approximately indicates complete combustion of the packaging and igniter layer in the charcoal cartridge, such as a generic peak temperature or a peak temperature specific to a type of the charcoal cartridge; confirm that the charcoal cartridge has come up to temperature upon detecting this temperature in the cartridge chamber; and then transition into temperature management mode accordingly. For example, by tracking a cartridge chamber (or cooking chamber) temperature over time following activation of the igniter, the controller can determine when the temperature inside the grill housing has just peaked (or is about to peak, such as indicated by the temperature in the cartridge chamber dropping or increasing at a rate less than 1.degree. F. per two-second interval), which may indicate that the packaging and the igniter layer in the charcoal cartridge has been fully consumed; the controller can then determine that the ignition mode is complete. The controller can thus implement a peak estimated temperature to trigger transition into the temperature management mode in order to ensure: thorough ignition throughout the volume of the charcoal cartridge; and complete consumption of the packaging and igniter layer before returning the grill housing to a target grill temperature at which the user may place food products inside the cooking chamber.

Therefore, the controller can monitor the charcoal grill system 100 for: the cartridge chamber temperature exceeding a preset ignition temperature (e.g., 700.degree. F., greater than the target grill temperature) indicating sufficient combustion of the charcoal cartridge; the cartridge chamber temperature exceeding a preset ignition temperature (e.g., 900.degree. F., greater than the target grill temperature) indicating complete combustion of the packaging and igniter layer in the charcoal cartridge; a negative or low rate of temperature change in the cartridge chamber indicating (near) complete combustion of the packaging and igniter layer in the charcoal cartridge; or a cooking chamber temperature exceeding the target grill temperature; etc. The controller can then transition into the temperature management mode accordingly.

In particular, the controller can: enter the ignition mode upon manual prompting by a user in Block S120; activate the igniter to ignite the charcoal cartridge in Block S122; activate the stoke fan to actively move fresh ambient air into the cartridge chamber to increase rate of combustion of the charcoal cartridge in Block S124; and monitor the state of the charcoal cartridge through one or more temperature sensors within the charcoal grill system 100, thereby automatically igniting and managing the charcoal cartridge on behalf of the user. As described below, the controller can then transition into the temperature management mode once a trigger event—such as a time- or temperature-based trigger event—is detected.

During the ignition mode, the controller can also: check and confirm that the lid and the cartridge chamber door are closed; and pause the ignition mode or selectively deactivate the cooling and stoke fans when either the lid or the cartridge chamber door are opened.

9. Temperature Sensor Calibration

In one variation in which a type of the charcoal cartridge is known prior to entering the ignition mode, the controller can: access a peak expected temperature in the cartridge chamber when a charcoal cartridge of this known type is ignited in the charcoal grill system 100; execute the ignition mode and activate the stoke fan to drive the charcoal cartridge to its peak temperature; monitor a temperature within the cartridge chamber during this ignition mode via the cartridge chamber temperature sensor; and store an actual peak temperature in the cartridge chamber during the ignition cycle. In this variation, the controller can also: store this peak temperature; and recalibrate the cartridge chamber temperature sensor such that the actual peak temperature read from the cartridge chamber temperature sensor now aligns to the peak expected temperature in the cartridge chamber.

The controller can therefore recalibrate the cartridge chamber temperature sensor (and/or any other temperature sensor in the charcoal grill system 100) based on known data associated with the charcoal cartridge or a type of the charcoal cartridge.

Alternatively, the charcoal grill system 100 can include an ambient temperature sensor and can calibrate the cartridge chamber temperature sensor to an output of the ambient temperature sensor prior to initiating the ignition cycle.

However, the charcoal grill system 100 can implement any other method or techniques to calibrate the cartridge chamber temperature sensor.

10. Temperature Management Function

The method S100 further includes, in response to the temperature inside the charcoal grill system 100 exceeding an ignition temperature: deactivating the stoke fan in Block S140; activating a cooling fan coupled to the cooking chamber to cool the cooking chamber down to the target grill temperature in Block S142; entering a temperature management mode; and selectively activating the stoke fan and the cooling fan to maintain the cooking chamber at approximately the target grill temperature during the temperature management mode in Block S152. Generally, once a time- or temperature-based trigger event indicating that the charcoal cartridge has come to temperature is detected in Block S130, the controller can: immediately deactivate the stoke fan (and shutter the stoke vent) to slow combustion and heat output of the charcoal cartridge in Block S140; activate the cooling fan to pump cool ambient air into the cooking chamber in order to rapidly cool the cooking chamber down to the target grill temperature in Block S142; and transition into the temperature maintenance mode in Block S150.

In one implementation shown in FIGS. 5A and 6, upon transitioning into the temperature maintenance mode in Block S150, the controller can implement closed-loop controls to selectively: activate the stoke fan (and deactivate the cooling fan) to increase the cooking chamber temperature by increasing the heat output of the charcoal cartridge; and activate the cooling fan (and deactivate the stoke fan) to decrease the cooking chamber temperature by injecting cooler ambient air into the cooking chamber based on temperatures read from one or more temperature sensors in the cooking chamber. For example, once the controller determines that the ignition mode is complete in Block S150, the controller can immediately: cease operation of the stoke fan (and trigger the stoke vent to close) in Block S140; and activate the cooling fan at maximum speed (and trigger the cooling vent to open fully) to push cooler ambient air into the cooking chamber inside the grill and to displace hot air out of the cooking chamber in Block S142, thereby quickly cooling the cooking chamber back down to the user-elected target grill temperature. As the cooking chamber temperature decreases and approaches the target grill temperature, the controller can decrease a speed of the cooling fan (and move the cooling vent toward the closed position), such as based on closed-loop control techniques in order to avoid undershooting the target grill temperature. Subsequently, if the controller determines that the cooking chamber temperature has dropped below the target grill temperature (or is near and declining toward the target grill temperature), the controller can deactivate the cooling fan and instead activate the stoke fan, such as at a low speed until the temperature rises back to the target grill temperature. As the cartridge is consumed over time and the cooking chamber temperature declines toward and past the target grill temperature, the controller can reactivate the stoke fan at higher speeds and/or for longer durations in order to maintain the target grill temperature inside the cooking chamber. Therefore, in Block S152, the controller can activate the stoke fan for periods of time and at speeds inversely proportional to a rate of increase in temperature within the cooking chamber when the stoke fan is active, which may be a function of remaining fuel volume or remaining fuel density in the charcoal cartridge. The controller can similarly activate the cooling fan for periods of time and at speeds proportional to a rate of decrease in temperature within the cooking chamber when the cooling fan is active, which may be a function of ambient air temperature.

As described above, the controller can automatically initiate a cook timer for the user-elected cook duration: upon transitioning from the ignition mode to the temperature maintenance mode; when the lid of the charcoal grill system 100 is opened and then closed (which may indicate that food has been placed in the cooking chamber); or when a cook timer is manually activated by the user; etc. The controller can implement the foregoing processes to maintain the temperature in the cooking chamber at the target grill temperature until the cook timer expires. Alternatively, the controller can operate in the temperature management mode: until a target food temperature is detected at the temperature probe; or until insufficient fuel remains in the charcoal cartridge to achieve the target grill temperature (e.g., once constant activation of the stoke fan at maximum speed is insufficient to drive the cooking chamber temperature to the target grill temperature). The controller can then execute an active burnout mode, a second cartridge mode, a low-temperature hold (or "fuel extend") mode, or an active cleaning mode, etc., such as automatically or based on a subsequent input from the user.

Furthermore, during the temperature management mode, the controller can execute the foregoing methods to maintain the cooking chamber temperature at the target grill temperature when sensors in the charcoal grill system 100 indicate that the lid and the cartridge chamber door are closed. However, the controller can: deactivate the stoke fan when these sensors indicate that the cartridge chamber door is open in order to reduce heat loss out of the cartridge chamber door; and deactivate the cooling fan when these sensors indicate that the lid is open in order to reduce heat loss out of the cooking chamber.

Furthermore, the charcoal grill system 100 can: estimate an amount of fuel remaining in the charcoal cartridge; and indicate this amount of fuel at the control panel, such as by activating one light element (e.g., an LED)—of ten light elements in the control panel—per 10% of fuel predicted to remain in the charcoal cartridge, thereby providing a real-time visual indicator of current fuel capacity in the charcoal grill system 100 to the user. Similarly, the charcoal grill system 100 can: estimate a duration of time that the charcoal cartridge may output sufficient thermal energy to maintain the current target grill temperature; and indicate this duration of time on a virtual countdown timer rendered on the control panel or indicate this duration of time on a physical clock integrated into the control panel, thereby providing a real-time visual indicator of remaining cook time at the charcoal grill system 100 for the user.

11. Post Temperature Management

Once a timer for the cook duration expires or once the temperature probe indicates that the target food temperature has been reached, the controller and the control panel can cooperate to issue an alarm or other instruction to the user while continuing to maintain the cooking chamber temperature at the target grill temperature, as described above. The control panel can also enable the user to modify the target grill temperature (within the operating temperature range of the charcoal cartridge) throughout operation of the charcoal grill system 100, and the controller can automatically activate the stoke fan or the cooling fan to drive the cooking chamber to this target grill temperature upon receipt of such change from the user, as shown in FIG. 5B.

In one variation shown in FIGS. 5A and 5B, once the controller determines that the temperature management mode is complete—such as once a timer for the cook duration expires or once the temperature probe indicates that the target food temperature has been reached—the controller can transition into one of an active burnout mode, a second cartridge mode, a low-temperature hold mode, an active cleaning mode, or other secondary mode, such as automatically or based on a subsequent input from the user.

In this variation, the control panel can prompt the user to select a next mode following conclusion of the temperature management mode. In one implementation, the controller and the control panel can: predict an amount of fuel left in the charcoal cartridge and/or a remaining combustion duration of the charcoal cartridge upon conclusion of the temperature management mode based on time and temperature settings entered by the user; identify a subset of secondary modes that may be executable at the charcoal grill system 100 based on the estimated fuel and/or combustion duration remainder; and prompt the user to select one or more of these secondary modes following conclusion of the temperature management mode prior to entering the ignition mode. For example, if the controller estimates that at least 90% fuel in the charcoal cartridge will be consumed upon conclusion of the temperature management mode, the controller can enable the user to select either the active burnout mode, the low-temperature hold mode, or the second cartridge mode while excluding the active cleaning mode for which the charcoal cartridge has insufficient fuel. The control panel can additionally or alternatively prompt the user to select a next mode upon nearing or reaching conclusion of the temperature management mode.

Yet alternatively, the controller can automatically select a secondary mode following conclusion of the temperature management mode. For example, the controller can automatically transition into a low-temperature hold mode upon conclusion of the temperature management mode and execute the low-temperature hold mode for a preset hold duration (e.g., ten minutes) while the control panel renders a prompt to elect a next mode (or awaits a response from the user to an electronic notification containing a prompt to select a next mode). If the user fails to select a next mode within this preset hold duration, the controller can automatically transition to the active burnout mode. However, if the user responds to this prompt with a call to remain in the low-temperature hold mode: the controller can remain in the low-temperature hold mode, reset a timer for the preset hold duration, and await a next response from the user. Alternatively, if the user responds to this prompt with selection of an alternate secondary mode, the controller can transition into the selected secondary mode. Yet alternatively, if the user responds to this prompt with entry of a new target grill temperature, new target food temperature, or new cook duration, the controller can transition back into the temperature management mode and implement these new cook parameters, as described above.

11.1 Active Burnout

The controller can transition into the active burnout mode, such as: in response to manual selection by the user via the control panel; or automatically if the charcoal grill system 100 is idle for more than a preset hold duration following completion of the temperature management mode. In the active burnout mode, the controller can: activate the stoke fan at maximum speed to accelerate combustion of the remainder of the charcoal cartridge; activate the cooling fan at maximum speed in order to minimize the cooking chamber temperature. Once the cartridge chamber temperature (or the cooking chamber temperature) drops below a preset burnout temperature (e.g., 140.degree. F.), the controller can then deactivate both the stoke fan and the cooling fan and enter an inactive (or "hibernate" or "off") mode, as shown in FIG. 6.

The controller can thus execute the burnout mode to rapidly consume remaining fuel in the charcoal cartridge, thereby: reducing physical waste left over in the cartridge chamber; reducing soot output by the charcoal cartridge; and enabling the user to stow the charcoal grill system 100 sooner and without further manual oversight.

11.2 Second Cartridge Mode

In another implementation, if insufficient fuel remains in the charcoal cartridge to achieve the target grill temperature selected by the user, the controller can transition into a second cartridge mode and then: prompt the user to insert a second charcoal cartridge into the cartridge chamber via the control panel; stoke the second charcoal cartridge once inserted to get the second charcoal cartridge up to temperature; and then return to the temperature management mode to bring and maintain the cooking chamber temperature back to the target grill temperature.

In one example, in response to failure to increase temperature within the cooking chamber to the target grill temperature when the stoke fan is active and the cooling fan is inactive in the temperature management mode, the controller can: detect insufficient fuel remaining in the charcoal cartridge; enter the second cartridge mode accordingly; and then issue a prompt or notification to the user, such as via the control panel, to insert a second charcoal cartridge into the cartridge chamber. In particular, once activation of the stoke fan—even at maximum speed—no longer achieves the target grill temperature inside the cooking chamber, the controller can determine that insufficient fuel remains in the charcoal cartridge to achieve requirements previously selected by the user and then prompt the user to either insert a second cartridge into the cartridge chamber (or elect an active burnout mode at the charcoal grill system 100 to consume the remainder of the cartridge, as described above).

If the user confirms use of a second charcoal cartridge responsive to this prompt, the controller can unlock the cartridge chamber door. The user can then open the cartridge chamber door, partially insert the second cartridge into the cartridge chamber, and then close the cartridge chamber door, which forces the second charcoal cartridge into the cartridge chamber against the remainder of the first cartridge, which may automatically ignite the second charcoal cartridge. In this implementation, the controller can also: cooperate with the control panel to prompt the user to remove food from the cooking chamber prior to inserting the second charcoal cartridge; pause a cook timer once this food is removed (or once the lid is opened); activate the stoke fan and deactivate the cooling fan once the second charcoal cartridge is loaded in order to rapidly bring the second charcoal cartridge up to temperature and to burn off packaging and the igniter layer from the second charcoal cartridge, such as once the cartridge chamber door is closed; transition back to the temperature management mode once a trigger event is detected, as described above; prompt the user to return the food to the cooking chamber once the target grill temperature is reached in the cooking chamber; and then resume the cook timer accordingly (e.g., once the lid is opened and closed again or once the user confirms via the control panel that the food has been returned). The controller can then repeat the foregoing methods and techniques to achieve temperature and time parameters set by the user.

The controller can therefore execute the second cartridge mode: to prompt insertion of a second charcoal cartridge into the cartridge chamber when the previous charcoal cartridge was sufficiently consumed; to automatically bring the second charcoal cartridge up to temperature; and to then automatically resume the temperature management mode.

11.3 Active Cleaning Mode

The controller can also selectively execute an active cleaning mode to heat cycle the grill chamber, which may clean debris from the interior of the cartridge chamber and the cooking chamber. In one implementation, once the cook duration is complete or the target food temperature is reached, the controller estimates an amount of fuel remaining in the charcoal cartridge, such as based on (e.g., an inverse function of) the speed, duration, and/or frequency that the controller previously activated the stoke fan to increase the temperature within cooking chamber. If the controller determines that the charcoal cartridge still contains an amount of fuel sufficient to significantly increase the temperature in the cooking chamber, the controller can: prompt the user to confirm the active cleaning mode; transition into the active cleaning mode once confirmed by the user (and once the user removes any remaining food from the cooking chamber); and then automatically activate the stoke fan to its maximum speed and deactivate the cooling fan in order to drive up the temperature in the cooking chamber, as shown in FIG. 6.

Furthermore, throughout the active cleaning mode, the controller can monitor the temperature in the cooking chamber and detect a peak temperature in the cooking chamber accordingly. The controller can automatically transition into the active burnout mode, as described above: once the cartridge chamber reaches the peak temperature; following a preset duration (e.g., five minutes) after the cooking chamber reaches the peak temperature; or after the cooking chamber reaches another threshold cleaning temperature for a preset threshold cleaning time.

11.4 Low-Temperature Hold Mode

The controller can also selectively execute a low-temperature hold mode to reduce the cooking chamber temperature and reduce the rate of consumption of the charcoal cartridge while preserving an option to rapidly raise the cooking chamber temperature back up to the same or new target grill temperature following subsequent input from the user. In one implementation, once the cook duration is complete or the target food temperature is reached, the controller can: serve a notification to the user to remove the foodstuff from the charcoal grill system 100; and automatically transition into the low-temperature hold mode by default, as shown in FIG. 6. In the low-temperature hold mode, the controller can selectively activate the stoke fan and the cooling fan to maintain the cooking chamber at approximately a low hold temperature, such as a minimum temperature in the operating temperature range of the charcoal cartridge (e.g., 175.degree. F. for a "low-and-slow" charcoal cartridge, 250.degree. F. for a standard charcoal cartridge etc.).

Subsequently, the controller can transition from the low-temperature hold mode back to the temperature management mode in response to receiving a second target grill temperature and selectively activate the stoke fan and the cooling fan to maintain the cooking chamber at approximately the second target grill temperature, as described above. However, if the user fails to enter a new target grill temperature or otherwise respond to this prompt within a preset hold duration, the controller can automatically transition into the active burnout mode, as described above.

12. Temperature-Based Cartridge Identification

In one variation shown in FIG. 6, the controller identifies the type of the charcoal cartridge by matching ignition and early combustion characteristics of the charcoal cartridge as the charcoal cartridge combusts during the ignition mode, such as rather than read a type or UUID from the charcoal cartridge or rather than prompt the user to enter a type of the charcoal cartridge prior to entering the ignition mode.

In one implementation, the controller: monitors the temperature inside the charcoal grill system 100 during the ignition mode in Block S130; characterizes a combustion rate of the charcoal cartridge based on the temperature inside the charcoal grill system 100 during the ignition mode; matches the combustion rate of the charcoal cartridge during the ignition mode to a known combustion rate of a particular charcoal cartridge type in a set of charcoal cartridge types;

and identifies the charcoal cartridge as of the particular charcoal cartridge type accordingly. The controller can then implement methods and techniques described above to access the operating temperature range, a combustion duration, and/or a combustion model, etc. of the charcoal cartridge based on the particular charcoal cartridge type of the charcoal cartridge thus determined.

In a similar example, the controller can: identify a peak temperature inside the cartridge chamber during the ignition mode; and then confirm the type of the charcoal cartridge selected at the control panel based on the peak temperature inside the charcoal grill system 100 during the ignition mode approaching a known peak temperature associated with the type of the charcoal cartridge, in a set of known types of charcoal cartridges.

The controller can implement similar methods and techniques to compare a temperature profile, a rate of temperature increase, etc. recorded in the cartridge chamber as the charcoal cartridge combusts during the ignition mode to similar values associated with various types of charcoal cartridges and to identify a particular type of the charcoal cartridge accordingly. Therefore, in this variation, the controller can characterize (or "fingerprint") combustion characteristics of the charcoal cartridge as the charcoal cartridge combusts in the cartridge chamber during the ignition mode and identify a type of the charcoal cartridge accordingly.

The controller can then automatically select a default target grill temperature based on the type of the cartridge, such as a center temperature within the operating temperature range associated with the type of the charcoal cartridge. Alternatively, the controller can select a target grill temperature that is common to this type of charcoal cartridge, such as: 225.degree. F. for a low-and-slow cartridge type with a useful temperature range of 175.degree. F. to 250.degree. F.; 375.degree. F. for a standard cartridge type with a useful temperature range of 300.degree. F. to 500.degree. F.; or 900.degree. F. for a charcoal-fired pizza cartridge type with a useful temperature range of 700.degree. F. to 950.degree. F. Yet alternatively, the controller can set the default target grill temperature at the maximum temperature in the operating temperature range of the charcoal cartridge, thereby enabling the controller to quickly drop the cooking chamber temperature by deactivating the stoke fan and activating the cooling fan once the user manually sets a different target grill temperature via the control panel. Alternatively, the controller can set the default target grill temperature at a minimum temperature in the operating temperature range of the charcoal cartridge in order to extend a combustion duration of the charcoal cartridge or a last temperature selected at the charcoal grill system 100 for a charcoal cartridge of this same type.

Once the controller thus automatically identifies the type of charcoal cartridge, the controller can enable the user to set time and temperature parameters at the control panel. For example, the controller can cooperate with the control panel to: indicate to the user the type of charcoal cartridge detected; communicate the operating temperature range of the charcoal cartridge; prompt the user to enter a target grill temperature within this operating temperature range; bound a maximum cook duration based on the user-selected target grill temperature; prompt the user to enter a cook duration within this bound; and/or prompt the user to select a target food temperature; as described above. Once the controller receives these parameters from the user, the controller can implement these parameters during the temperature management mode accordingly.

Alternatively, the controller can cooperate with the control panel to receive time and temperature parameters from the user via the control panel in Block S110 without first confirming the type of the cartridge. In this implementation, the controller can then: determine the type of the charcoal cartridge based on combustion characteristics of the charcoal cartridge detected during the ignition mode; and confirm that the charcoal cartridge is capable of the time and temperature parameters selected by the user. If the charcoal cartridge is so capable, the controller can implement closed-loop controls to implement these parameters during the temperature management mode in Block S150, as described above. However, if the charcoal cartridge is not so capable, the controller can prompt the user to modify these parameters—via control panel—to align with known capabilities of the type of the charcoal cartridge.

However, the controller can implement any other method or technique to determine a type of the charcoal cartridge based on data collected at the charcoal grill system 100 during the ignition mode.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method of managing temperature in a grill having a cartridge chamber and an igniter positioned within the cartridge chamber, the method comprising:
   (a) receiving an ignition trigger signal;
   (b) activating, in response to (a), the igniter to generate heat and ignite a charcoal cartridge positioned in the cartridge chamber;
   (c) activating, in response to (a), a stoke fan to flow ambient air from outside the grill into the cartridge chamber;
   (d) receiving temperature data from a temperature sensor within a cooking chamber of the grill;
   (e) determining, based on the temperature data, a temperature within the cooking chamber; and
   (f) controlling, based on the temperature data, a speed of one or more of the stoke fan and a cooling fan, wherein the cooling fan is configured to flow ambient air from outside the grill into the cooking chamber.

2. The method of claim 1, further comprising:
(g) determining, based on the temperature data, whether the temperature in the cooking chamber has exceeded an ignition temperature.

3. The method of claim 1, wherein (f) further includes adjusting the speed of the stoke fan.

4. The method of claim 1, wherein (f) further includes maintaining the speed of the stoke fan.

5. The method of claim 1, wherein (f) further includes activating the cooling fan to flow ambient air from outside the grill into the cooking chamber.

6. The method of claim 1, further comprising:
(g) receiving a target grill temperature for the cooking chamber; and
(h) determining, based on the temperature data, that the temperature in the cooking chamber is above the target grill temperature, wherein:
(f) further includes reducing the speed of the stoke fan and causing the cooling fan to flow ambient air from outside the grill into the cooking chamber in response to determining that the temperature in the cooking chamber is above the target grill temperature.

7. The method of claim 1, further comprising:
(g) receiving a target grill temperature for the cooking chamber; and
(h) determining, based on the temperature data, that the temperature in the cooking chamber is below the target grill temperature, wherein:
(f) further includes causing, in response to determining that the temperature in the cooking chamber is below the target grill temperature, the stoke fan to flow ambient air from outside the grill into the cartridge chamber.

8. The method of claim 1, further comprising:
(g) receiving second temperature data from a second temperature sensor within the cartridge chamber of the grill;
(h) determining, based on the second temperature data in (g), that the charcoal cartridge ignited; and
(i) deactivating the igniter in response to determining in (h) that the charcoal cartridge did ignite.

9. The method of claim 1, wherein (a) includes receiving the ignition trigger signal from a mobile device.

10. The method of claim 1, further comprising:
(g) receiving a target grill temperature for the cooking chamber; and
(h) issuing an alarm in response to determining that the temperature of the cooking chamber has reached the target grill temperature.

11. The method of claim 1, further comprising:
(g) receiving a target food temperature;
(h) receiving second temperature data from a second temperature sensor, wherein the second temperature data is representative of a temperature inside a foodstuff;
(i) determining, based on the second temperature data in (h), that the temperature inside the foodstuff has reached the target food temperature; and
(j) reducing, in response to determining that the temperature in inside the foodstuff has reached the target food temperature, a speed of the stoke fan.

12. The method of claim 11, further comprising:
(k) issuing an alarm in response to determining that the temperature inside the foodstuff has reached the target food temperature.

13. A grill system comprising:
a grill housing defining a cooking chamber and a cartridge chamber, wherein:
the cartridge chamber is configured to support a charcoal cartridge and to cause heat to be transferred to the cooking chamber, and
the cooking chamber is configured to support foodstuffs;
an igniter extending into the cartridge chamber and configured to generate heat and cause a charcoal cartridge positioned in the cartridge chamber to ignite;
a stoke fan configured to flow air from outside the grill housing and into the cartridge chamber; and
a cooling fan configured to flow ambient air from outside the grill housing and into the cooking chamber without flowing through the cartridge chamber.

14. The grill system of claim 13, wherein the cartridge chamber further includes a drawer that is configured to receive the charcoal cartridge.

15. The grill system of claim 14, wherein the drawer is further configured to seat a received charcoal cartridge in contact with the igniter.

16. The grill system of claim 13, wherein the cartridge chamber is configured to receive a cartridge laterally.

17. The grill system of claim 13, wherein the igniter comprises a resistance heater.

18. The grill system of claim 13, wherein the igniter is configured to press against a cartridge when the cartridge is fully inserted into the cartridge chamber.

19. The grill system of claim 13, wherein the cooking chamber is over the cartridge chamber.

20. The grill system of claim 13, further comprising a controller having one or more processors and one or more non-transitory memory devices, the one or more non-transitory memory devices storing instructions to cause the one or more processors to:
(a) receive an ignition trigger signal,
(b) activate, in response to (a), the igniter to generate heat and ignite a charcoal cartridge positioned in the cartridge chamber, and
(c) activate, in response to (a), the stoke fan to flow ambient air from outside the grill into the cartridge chamber.

21. The grill system of claim 20, further comprising one or more temperature sensors located in the cooking chamber, wherein the one or more non-transitory memory devices further store instructions to control the one or more processors to:
(d) receive temperature data from the one or more temperature sensors within the cooking chamber,
(e) determine, based on the temperature data, a temperature in the cooking chamber, and
(f) control, based on the determination in (e), a speed of the stoke fan.

22. The grill system of claim 21, further comprising a control panel configured to generate the ignition trigger signal and generate a target grill temperature signal, wherein:
(a) further includes receiving the ignition trigger signal from the control panel, and
the one or more non-transitory memory devices further store instructions for controlling the one or more processors to receive the target grill temperature signal from the control panel, and
(f) further includes controlling, based on the determination in (e) and on the target grill temperature signal, the speed of the stoke fan.

23. The grill system of claim 21, further comprising a wireless communication module configured to connect with a mobile device, wherein:
- (a) further comprises receiving the ignition trigger signal from the mobile device, and
- the one or more non-transitory memory devices further store instructions for controlling the one or more processors to receive a target grill temperature from the mobile device, and
- (f) further includes controlling, based on the determination in (e) and on the target grill temperature, the speed of the stoke fan.

\* \* \* \* \*